(12) United States Patent
Yamada et al.

(10) Patent No.: US 7,242,822 B2
(45) Date of Patent: Jul. 10, 2007

(54) OPTICAL CONNECTION BOARD AND OPTICAL SIGNAL TRANSMISSION

(75) Inventors: Fumiaki Yamada, Yokohama (JP); Yoichi Taira, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 11/022,018

(22) Filed: Dec. 23, 2004

(65) Prior Publication Data

US 2005/0163416 A1 Jul. 28, 2005

(30) Foreign Application Priority Data

Dec. 26, 2003 (JP) ............................. 2003-435406

(51) Int. Cl.
*G02B 6/12* (2006.01)

(52) U.S. Cl. ........................................ 385/14
(58) Field of Classification Search ................... 385/14
See application file for complete search history.

(56) References Cited

U.S. PATENT DOCUMENTS

| 4,130,345 | A | * | 12/1978 | Doellner | 385/44 |
| 4,465,333 | A | * | 8/1984 | Caserta et al. | 385/73 |
| 5,125,054 | A | * | 6/1992 | Ackley et al. | 385/49 |
| 5,390,266 | A | * | 2/1995 | Heitmann et al. | 385/44 |
| 5,394,495 | A | * | 2/1995 | Booth et al. | 385/59 |
| 6,257,771 | B1 | * | 7/2001 | Okayasu | 385/89 |
| 6,516,107 | B1 | * | 2/2003 | Gardner et al. | 385/16 |
| 6,657,723 | B2 | * | 12/2003 | Cohen et al. | 356/328 |
| 6,693,736 | B1 | * | 2/2004 | Yoshimura et al. | 359/333 |
| 6,829,398 | B2 | * | 12/2004 | Ouchi | 385/14 |
| 6,839,476 | B2 | * | 1/2005 | Kim et al. | 385/14 |
| 7,076,125 | B2 | * | 7/2006 | Kouta et al. | 385/14 |
| 2003/0128933 | A1 | * | 7/2003 | Bona et al. | 385/50 |
| 2003/0179979 | A1 | * | 9/2003 | Ouchi | 385/14 |
| 2004/0114866 | A1 | * | 6/2004 | Hiramatsu | 385/39 |

OTHER PUBLICATIONS

Japanese Publication No. 2000-235127 published on Aug. 28, 2000.
Japanese Publication No. 2000-227524 published on Aug. 15, 2000.

* cited by examiner

*Primary Examiner*—Ellen E. Kim
(74) *Attorney, Agent, or Firm*—Ido Tuchman; Lisa M. Yamonaco

(57) ABSTRACT

Optical signal transmission system comprising optical signal transmission board having first optical waveguide, and optical connection board having second optical waveguide and inserted into opening of optical signal transmission board substantially perpendicularly thereto, opening being provided in upper surface of transmission board. The board comprises: a first board; the first optical waveguide extended on an upper surface of the first board; and a second board made parallel to the first board, the opening extended from the upper surface thereof toward the first board is provided in the optical signal transmission board. The optical connection board comprises: a third board; second optical waveguide extended on an upper surface of the third board; and reflection surface provided in end portion of second optical waveguide, reflecting light traveling through the second optical waveguide, and making the light incident onto the first optical waveguide extended in a direction substantially perpendicular to the board.

24 Claims, 14 Drawing Sheets

OPTICAL CONNECTION BOARD AND OPTICAL SIGNAL TRANSMISSION

FIELD OF THE INVENTION

The present invention relates to an optical connection board, an optical signal transmission system, and manufacturing methods thereof. In particular, the present invention relates to an optical connection board for performing optical signal transmission by means of an optical waveguide provided in an inner layer of the optical signal transmission board, an optical signal transmission system, and manufacturing methods thereof.

BACKGROUND OF THE INVENTION

As a processing speed of an electronic device has been increased, densification of signal wiring connecting the electronic device with the others with the increase in signal speed have become technical challenges. In conventional electric signal transmission technology, as the speed of signal increases, a dielectric loss and electromagnetic radiation in a periphery of the wiring are increasing. For this reason, in order to realize transmission speed equal to or more than several gigabits per second, a technical design is required for selection of a dielectric material, wiring density of transmission channels and the like, and the wiring becomes subject to physical restrictions.

In order to avoid such restrictions and to realize signal transmission at higher speed and with higher density, optical wiring by means of an optical waveguide and an optical fiber (hereinafter, collectively referred to as an "optical waveguide") has been being studied. Here, for the purpose of supply of a power source for driving the electronic device and of low-speed signal transmission, it becomes necessary to make electric wiring coexist simultaneously with the optical wiring because the optical wiring has small economic advantage.

Japanese Patent Laid-Open No. 2000-227524 (hereinafter referred to as "Patent Document 1") and Japanese Patent Laid-Open No. 2000-235127 (hereinafter referred to as "Patent Document 2") disclose optical waveguide structures in each of which the electric wiring and the optical waveguide structure are mixed. In Patent Document 1, the optical waveguide is formed on a board, and on the optical waveguide, a light emitting element and a light receiving element are provided. Then, light emitted from the light emitting element is reflected on one end of the optical waveguide substantially at a right angle, propagated through the optical waveguide, reflected on the other end substantially at a right angle, and made incident onto the light receiving element. The optical waveguide structure of Patent Document 1 is constructed in a manner as described above. In Patent Document 2, while the light emitting element and the light receiving element are provided on an upper surface of the board, the optical waveguide is provided on a lower surface of the board, the light emitted from the light emitting element is guided to the lower surface of the board, and propagated through the optical waveguide. Then, the light is reflected on an end portion of the optical waveguide, and made incident onto the light receiving element located on the upper surface of the board. The optical waveguide structure of Patent Document 2 is constructed in a manner as described above.

There is a possibility that the optical waveguide, for use in the board in which the electric wiring and the optical waveguide structure are mixed, may be exposed to high temperature in a manufacturing process of an electric wiring board and an mounting process of components, and may be subjected to a mechanical impact and the like in use of the completed board. Therefore, it is preferable that the optical waveguide be mounted in an inner layer of the board to the extent possible. Furthermore, in order to avoid an influence of warp of the board, a structure is preferable, in which the optical waveguide is disposed at the center of the board, and boards on both sides of the optical waveguide, which sandwich the optical waveguide, are made of materials equal in thermal expansion coefficient and thickness so as to be arranged symmetrically to each other in a thickness direction.

More specifically, the board is heated in steps shown below in the manufacturing process of the laminated electric wiring board.

In a laminating step of the boards, the boards are stacked with adhesive resin being sandwiched therebetween, and the resin is cured for a few hours at temperature of a hundred and several ten degrees centigrade (180 to 190 degrees centigrade) with pressure. With regard to heat resistance of resin for use as a material of the optical waveguide, in general, phase transition temperature or glass transition temperature using a change of mechanical impedance as an index is conceived as a measure. However, when the resin is heated on exposure to air, a degradation in optical characteristics, such as yellowing, may sometimes be brought by a thermochemical reaction with the air though mechanical strength of the resin is maintained. Hence, in order to prevent such a degradation, it is effective to shield the optical waveguide from the air by disposing the waveguide not on a surface layer of the board but in the inner layer to the extent possible.

Moreover, in the step of mounting (assembling) components on the board, soldering process is performed in almost all the cases. In recent years, solder of lead-free type has used in consideration of the environment, and temperature of approximately 260° C. in the soldering process has become higher than the conventional temperature. Optically transparent acrylic resin and the like, which have heat resistance even to such a relatively high temperature, have been announced, and in the future, problems regarding the heat resistance will be reduced pretty much by using such resins. However, it is thought to be difficult to avoid the degradation of the optical characteristics due to the thermal reaction with the air, and also in order to solve this process problem, it is effective to dispose the optical waveguide in the inner layer of the board. Then, a time for the soldering process is relatively short, and accordingly, if the optical waveguide is disposed in the inner layer protected by resin layers in which heat conduction is relatively small, temperature increase in the inside can be restricted.

As described above, instead of adopting the structure in which the optical waveguide is exposed on the surface of the board as in Patent Documents 1 and 2, the disposition of the optical waveguide in the innermost layer of the board has a great practical advantage in terms of avoiding the problems in the manufacturing process and the assembly. However, in this structure, the optical waveguide in the laminated board and a light receiving/emitting element mounted on the surface of the board will be arranged to be spaced at a distance corresponding to the thickness of the board. For this reason, an optical component connection technology will be required. In this technology, an array of high density optical signal transmission paths is disposed in the inner layer of the laminated wiring board. Then, the light receiving/emitting element, the light receiving/emitting board, and the like, which are mounted on the board, and the array of the high density optical signal transmission paths, are optically connected to each other at a distance ranging from several ten microns to several millimeters.

Specifically, when the optical waveguide is disposed in the inner layer portion of the board, a structure for changing the direction of the light and a structure for guiding the light to the surface of the board will be required between the optical waveguide and the light receiving/emitting element which is mounted on the surface of the board. Here, when the light is propagated in the air between the optical waveguide and the light receiving/emitting element, the most part of the light does not reach the light receiving element but is dispersed in a periphery thereof, and coupling efficiency is significantly lowered. Furthermore, when the optical wiring is mounted with high density, the light is received by adjacent light receiving elements, causing a large interchannel crosstalk. Hence, in such a structure, it is difficult to realize optical connection in which, with regard to the density of the optical wiring, a wiring pitch is shorter than 250 microns realized by the current fiber ribbon, and the connection distance between the optical waveguide and the light receiving/emitting element is set in a range from several ten microns to several millimeters.

In order to avoid this problem, in Patent Document 2, a lens is used between the optical waveguide and the light receiving/emitting element. However, a divergence angle (numerical aperture: NA) of the light of the multimode fiber or optical waveguide or of the light of the light emitting element is generally 0.2 or more, and when the connection distance l is set at 1 mm, a relationship is unwillingly established as:

$$l \cdot \sin\theta = l \cdot NA = 0.2 \text{ mm} \approx \text{wiring pitch}$$

Therefore, signal separation between the adjacent lines of wiring becomes difficult.

SUMMARY OF THE INVENTION

Consequently, it is an object of the present invention to provide an optical connection board, an optical signal transmission system, and manufacturing methods thereof, which are capable of solving the foregoing problems. This object is achieved by combinations of features described in independent claims in the claims. Moreover, dependent claims define further advantageous concrete examples of the present invention.

According to a first aspect of the present invention, provided is an optical connection board inserted into an opening of an optical signal transmission board substantially perpendicularly thereto, the opening being provided in an upper surface of the optical signal transmission board having a first optical waveguide, the optical connection board comprising: a board; a second optical waveguide extended on an upper surface of the board; and a reflection surface provided in an end portion of the second optical waveguide, reflecting light traveling through the second optical waveguide, and making the light incident onto the first optical waveguide extended in a direction substantially perpendicular to the board. Moreover, a manufacturing method of the optical connection board is provided.

According to a second aspect of the present invention, provided is an optical signal transmission system comprising an optical signal transmission board having a first optical waveguide, and comprising an optical connection board having a second optical waveguide and inserted into an opening of the optical signal transmission board substantially perpendicularly thereto, the opening being provided in an upper surface of the optical signal transmission board, wherein the optical signal transmission board comprises: a first board; the first optical waveguide extended on an upper surface of the first board; and a second board made parallel to the first board so that a lower surface thereof is in contact with an upper surface of the first optical waveguide, the opening extended from the upper surface thereof toward the first board is provided in the optical signal transmission board, and the optical connection board comprises: a third board; the second optical waveguide extended on an upper surface of the third board; and a reflection surface provided in an end portion of the second optical waveguide, reflecting light traveling through the second optical waveguide, and making the light incident onto the first optical waveguide extended in a direction substantially perpendicular to the third board. Moreover, a manufacturing method of the optical signal transmission system is provided.

Note that the above-described summary of the invention is not one listing all necessary features of the present invention, and sub-combinations of groups of these features can also be incorporated in the invention.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE PREFERRED EMBODIMENTS

Figure 1:
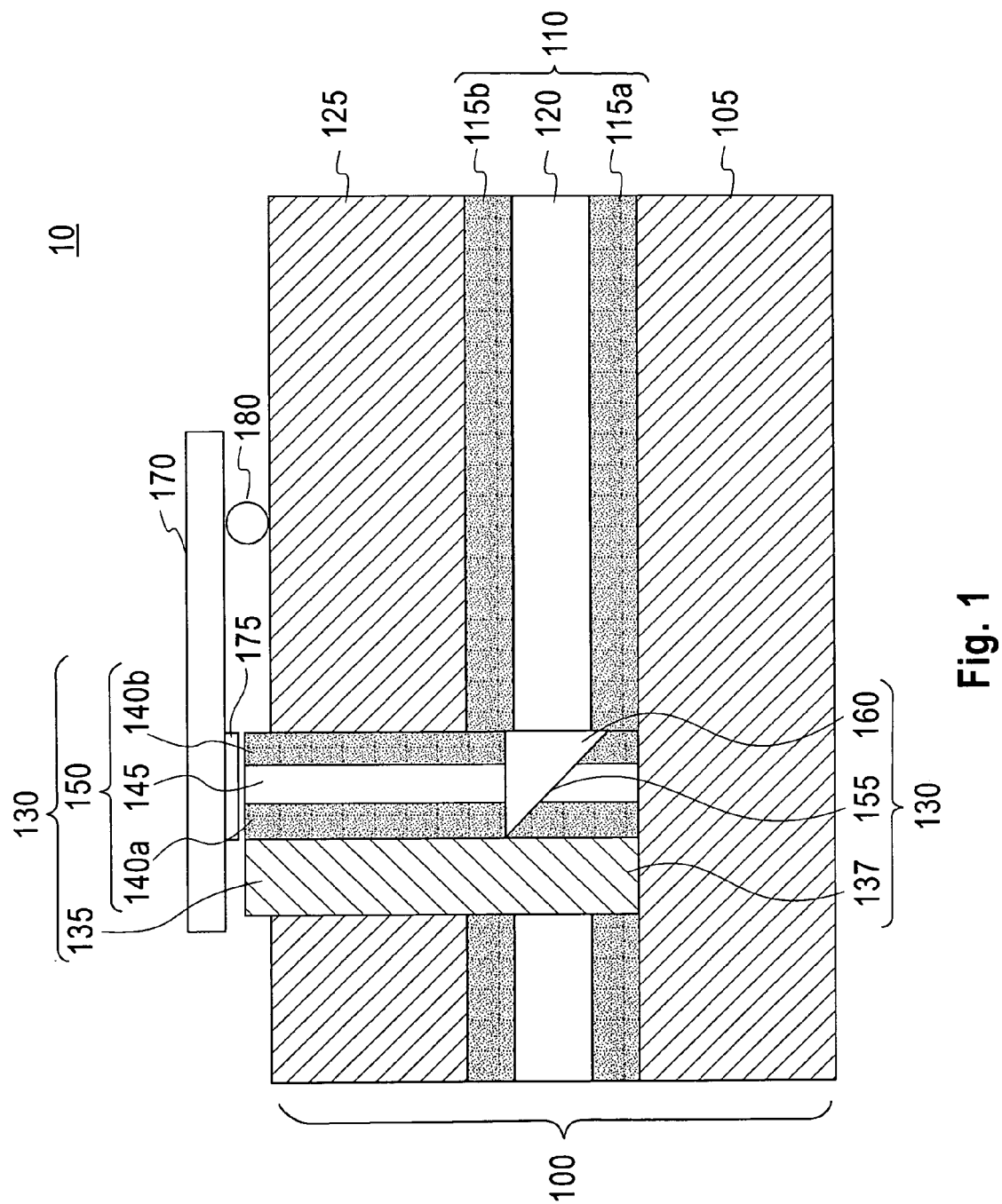
FIG. 1 shows a configuration of an optical signal transmission system 10 according to an embodiment of the present invention.

The present invention provides an optical connection board, an optical signal transmission system, and manufacturing methods thereof, which are capable of solving the foregoing problems. This object is achieved by combinations of features described in independent claims in the claims. Moreover, dependent claims define further advantageous concrete examples of the present invention.

According to a first aspect of the present invention, provided is an optical connection board inserted into an opening of an optical signal transmission board substantially perpendicularly thereto, the opening being provided in an upper surface of the optical signal transmission board having a first optical waveguide, the optical connection board comprising: a board; a second optical waveguide extended on an upper surface of the board; and a reflection surface provided in an end portion of the second optical waveguide, reflecting light traveling through the second optical waveguide, and making the light incident onto the first optical waveguide extended in a direction substantially perpendicular to the board. Moreover, a manufacturing method of the optical connection board is provided.

According to a second aspect of the present invention, provided is an optical signal transmission system comprising an optical signal transmission board having a first optical waveguide, and comprising an optical connection board having a second optical waveguide and inserted into an opening of the optical signal transmission board substantially perpendicularly thereto, the opening being provided in an upper surface of the optical signal transmission board, wherein the optical signal transmission board comprises: a first board; the first optical waveguide extended on an upper surface of the first board; and a second board made parallel to the first board so that a lower surface thereof is in contact with an upper surface of the first optical waveguide, the opening extended from the upper surface thereof toward the first board is provided in the optical signal transmission board, and the optical connection board comprises: a third board; the second optical waveguide extended on an upper surface of the third board; and a reflection surface provided in an end portion of the second optical waveguide, reflecting light traveling through the second optical waveguide, and making the light incident onto the first optical waveguide extended in a direction substantially perpendicular to the third board. Moreover, a manufacturing method of the optical signal transmission system is provided.

Note that the above-described summary of the invention is not one listing all necessary features of the present invention, and sub-combinations of groups of these features can also be incorporated in the invention.

The present invention will be described below through an embodiment thereof. However, the embodiment below is not one limiting the invention according to the claims, and not all combinations of features described in the embodiment are always essential to the solving means of the present invention.

FIG. 1 shows a configuration of an optical signal transmission system 10 according to this embodiment. The optical signal transmission system 10 according to this embodiment comprises an optical signal transmission board 100 having a first optical waveguide 110, and an optical connection board 130 having a second optical waveguide 150 and inserted into an opening provided on an upper surface of the optical signal transmission board 100 substantially perpendicularly to the optical signal transmission board 100. In the optical signal transmission system 10, a light receiving/emitting element 175 located above the upper surface of the optical signal transmission board 100 and the first optical waveguide 110 are connected to each other with high coupling efficiency.

The optical signal transmission board 100 comprises a first board 105, the first optical wave guide 110, and a second board 125. The first board 105 is, for example, a laminated wiring board such as a multilayer wiring board and a multilayer integrated board. The first optical waveguide 110 is an optical waveguide extended on an upper surface of the first board 105, and comprises a core 120 propagating light therethrough, and cladding layers 115a and 115b covering an outer circumference of the core 120. Here, the optical signal transmission board 100 may comprise a plurality of the first optical waveguides 110, and in this case, the plurality of first optical waveguides 110 may be composed of a plurality of the cores 120, and of cladding layers 115 serving as claddings covering the respective outer circumferences of the plurality of cores 120. The second board 125 is a board made parallel to the first board 105 so that a lower surface thereof is in contact with an upper surface of the first optical waveguide 110. Similarly to the first board 105, the second board 125 is, for example, a laminated wiring board such as a multilayer wiring board and a multilayer integrated board.

In the optical signal transmission board 100 described as above, an opening extended from the upper surface of the optical signal transmission board 100 toward the first board 105 and having a sidewall to which an end portion of the first optical waveguide 110 is exposed is provided.

The optical connection board 130 comprises a third board 135, the second optical waveguide 150, a reflection surface 155, and a connection portion 160. The third board 135 according to this embodiment is, for example, a single layer board, a laminated wiring board, or the like. The second optical waveguide 150 is an optical waveguide extended on an upper surface of the third board 135. The second optical waveguide 150 comprises a core 145 propagating light therethrough, and cladding layers 140a and 140b covering an outer circumference of the core 145. More specifically, the optical connection board 130 according to this embodiment further comprises a cladding layer 140 being in contact with the third board 135 and serving as a cladding of the second optical waveguide 150. Then, the second optical waveguide 150 may adopt a structure of comprising the core 145 extended parallel to the optical connection board 130 within the cladding layer 140.

Moreover, the optical connection board 130 may comprise a plurality of the second optical waveguides 150 correspondingly to the plurality of first optical waveguides 110. In this case, the plurality of second optical waveguides 150 may be composed of a plurality of the cores 145, and of cladding layers 140 covering the respective outer circumferences of the plurality of cores 145. In such a way, the plurality of light receiving/emitting elements and the plurality of first optical waveguides 110 can be optically coupled to each other by inserting the one optical connection board 130 into the opening of the optical signal transmission board 100. Thus, the second optical waveguide 150 and the first optical waveguide 110 can be mounted with high density, and manufacturing cost thereof can be reduced. Such a structure is particularly effective in the case of transmitting a plurality of signals in parallel.

The reflection surface 155 is provided in an end portion of the second optical waveguide 150. The reflection surface 155 is provided on the light emitting element-side of the optical connection board 130. The reflection surface 155 reflects light, which is made incident from the light emitting element and travels through the second optical waveguide 150, in a direction away from the third board 135. Then, the reflection surface 155 makes the light incident onto the core 120 of the first optical waveguide 110 extended in the direction substantially perpendicular to the third board 135. Moreover, the reflection surface 155 provided on the light receiving element-side of the optical connection board 130 reflects light incident from the first optical waveguide 110 which has an end portion exposed to a sidewall of the opening and is extended in the direction substantially perpendicular to the third board 135. Then, the reflection surface 155 makes the light incident onto the second optical waveguide 150.

The connection portion 160 is formed of a material of the core, and optically couples the core 145 of the second optical waveguide 150, the reflection surface 155, and the core 120 of the first optical waveguide 110 to one another by means of a function of the core material. Specifically, by means of the function of the core material, the connection portion 160 provided on the light emitting element-side of the optical connection board 130 propagates, to the reflection surface 155, light incident from the core 145 in the end portion of the second optical waveguide 150, in addition, propagates the light reflected by the reflection surface 155 by means of the function of the core material, and makes the light incident onto the core 120 in the end portion of the first optical waveguide 110. On the contrary, the connection portion 160 provided on the light receiving element-side of the optical connection board 130 propagates, to the reflection surface 155, light incident from the core 120 in the end portion of the first optical waveguide 110 by means of the function of the core material, in addition, propagates the light reflected by the reflection surface 155 by means of the function of the core material, and makes the light incident onto the core 145 in the end portion of the second optical waveguide 150. Thus, the connection portion 160 can reduce an optical coupling loss between the core 145 of the second optical waveguide 150 and the core 120 of the first optical waveguide 110.

Furthermore, the optical connection board 130 comprises a positioning portion 137 for determining depth of the optical connection board 130 inserted into the optical signal transmission board 100 so that, on the light emitting side, the light reflected by the reflection surface 155 is made incident onto the first optical waveguide 110, and that, on the light receiving side, the light emitted from the first optical waveguide 110 is made incident onto the reflection surface 155. Specifically, in a state where the optical connection board 130 is inserted into the opening of the optical signal transmission board 100 to a predetermined depth, the positioning portion 137 does not allow the optical connection board 130 to be further inserted into the optical signal transmission board 100, thus determining a position of the reflection surface 155 with respect to the first optical waveguide 110. More specifically, the positioning portion 137 according to this embodiment is a side surface of the third board 135 inserted into the opening of the optical signal transmission board 100. In a state where the side surface is in contact with a bottom surface of the opening, the positioning portion 137 does not allow the optical connection board 130 to be further inserted into the optical signal transmission board 100, thus determining the position of the reflection surface 155 with respect to the first optical waveguide 110.

As described above, the depth of the opening provided in the optical signal transmission board 100 and the position of the reflection surface 155 with respect to the side surface of the third board 135 are set precisely, and thus the position of the reflection surface 155 with respect to the first optical waveguide 110 can be properly determined by using the positioning portion 137.

An electronic device 170 is mounted on the upper surface of the optical signal transmission board 100. The electronic device 170 comprises the light receiving/emitting element 175 that is a light emitting element for outputting optical signals by light emission and making the optical signals incident onto the second optical waveguide 150 and/or a light receiving element for receiving optical signals emitted from the second optical waveguide 150. Moreover, the electronic device 170 comprises a terminal 180 for input and output of electric signals. Light outputted from the light emitting side of the light receiving/emitting element 175 is made incident onto the second optical waveguide 150 on the light emission side, propagated therethrough, reflected by the reflection surface 155 on the light emitting side, and then made incident onto the first optical waveguide 110. Then, the light propagated through the first optical waveguide 110 is reflected by the reflection surface 155 on the light receiving side, made incident onto the second optical waveguide 150 on the light receiving side, propagated through the second optical waveguide 150 on the light receiving side, and then made incident onto the light receiving/emitting element 175 on the light receiving side.

According to the optical signal transmission system 10 described as above, the first optical waveguide 110 disposed in the inner layer portion of the optical signal transmission board 100 can be connected to the light receiving/emitting element 175 mounted on the surface of the light transmission board 100 by the optical connection board 130 with high coupling efficiency. Moreover, the optical connection board 130 is inserted into the optical signal transmission board 100 after the laminating step and the soldering step of components in the manufacturing process are finished, thus making it possible to prevent the second optical waveguide 150 from being affected by heat.

Figure 2:
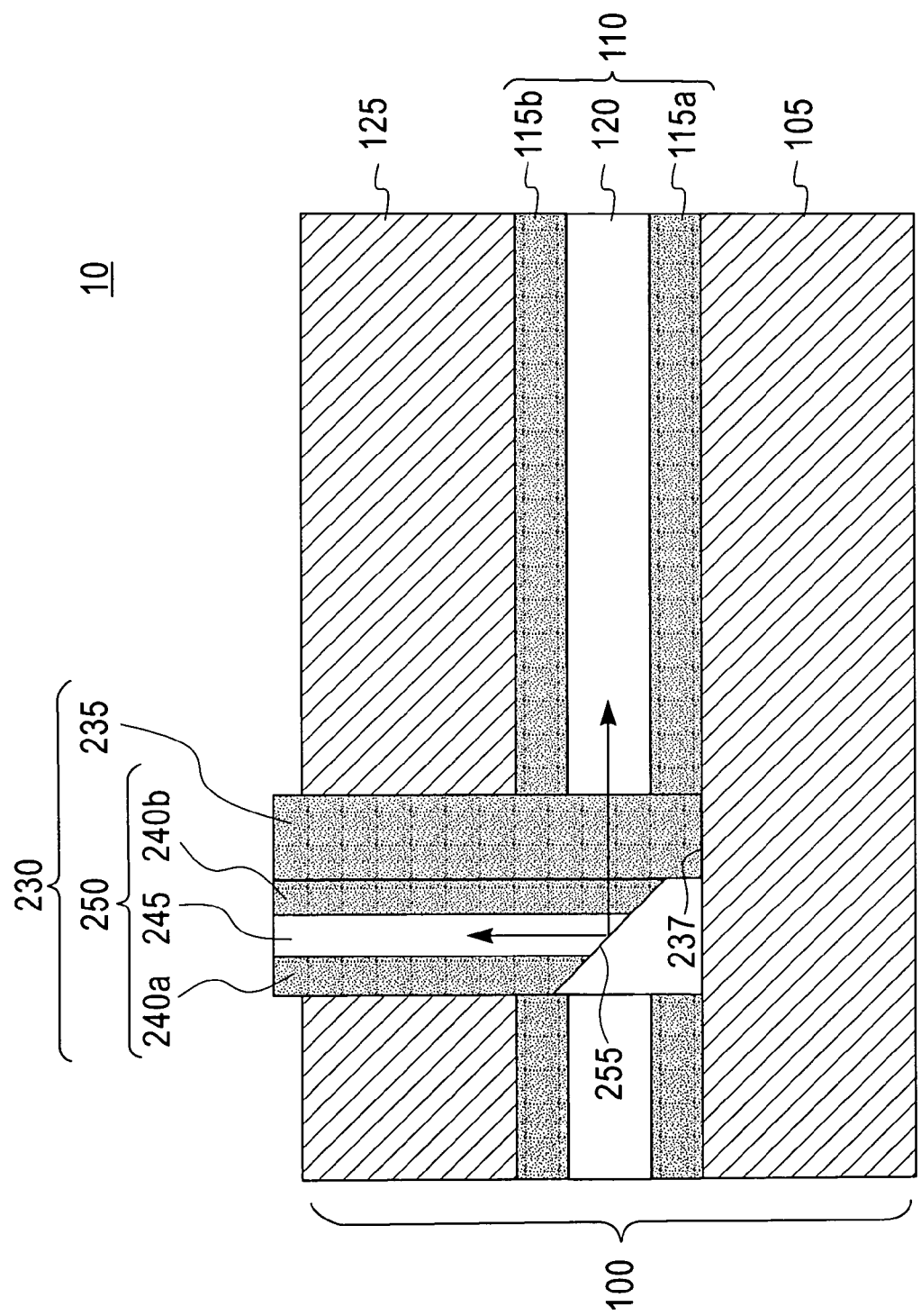
FIG. 2 shows a configuration of an optical signal transmission system 10 according to a first modification example of the embodiment of the present invention.

FIG. 2 shows a configuration of the optical signal transmission system 10 according to a first modification example of this embodiment. The optical signal transmission system 10 according to the first modification example adopts a configuration modified from the optical signal transmission system 10 shown in FIG. 1, and accordingly, description thereof will be omitted except for the following difference.

The optical signal transmission system 10 according to this modification example is different from the optical signal transmission system 10 shown in FIG. 1 in comprising an optical connection board 230 in place of the optical connection board 130.

The optical connection board 230 comprises a third board 235, a second optical waveguide 250, and a reflection surface 255. The third board 235 according to this modification example is an optically transparent board. Here, it is preferable that the third board 235 be thin as compared with the third board 135 shown in FIG. 1 in order to transmit light exchanged between the second optical waveguide 250 and the first optical waveguide 110. The second optical waveguide 250 is an optical waveguide extended on an upper surface of the third board 235. The second optical waveguide 250 comprises a core 245 propagating the light therethrough, and cladding layers 240a and 240b covering an outer circumference of the core 245. More specifically, the optical connection board 230 according to this modification example further comprises a cladding layer 240 being in contact with the third board 235 and serving as a cladding of the second optical waveguide 250. Then, the second optical waveguide 250 may adopt a structure of comprising the core 245 extended parallel to the optical connection board 230 within the cladding layer 240. Moreover, the optical connection board 230 may comprise a plurality of the second optical waveguides 250 correspondingly to the plurality of first optical waveguides 110. In this case, the plurality of second optical waveguides 250 may be composed of a plurality of the cores 245, and of cladding layers 240 covering the respective outer circumferences of the plurality of cores 245.

The reflection surface 255 is provided in an end portion of the second optical waveguide 250. The reflection surface 255 is provided on the light emitting element-side of the optical connection board 230. The reflection surface 255 reflects light, which is made incident from the light emitting element and travels through the second optical waveguide 250, in a direction to the third board 235. Then, the light is transmitted through the third board 235, and is made incident onto the core 120 of the first optical waveguide 110 extended in the direction substantially perpendicular to the third board 235. Meanwhile, the reflection surface 255 provided on the light receiving element-side of the optical connection board 230 reflects light incident from the first optical waveguide 110 which has an end portion exposed to a sidewall of the opening and is extended in the direction substantially perpendicular to the third board 235. Then the light is transmitted through the third board 235, and is made incident onto the second optical waveguide 250.

Furthermore, the optical connection board 230 comprises a positioning portion 237 for determining depth of the optical connection board 230 inserted into the optical signal transmission board 100 so that, on the light emitting side, the light reflected by the reflection surface 255 is made incident onto the first optical waveguide 110, and that, on the light receiving side, the light emitted from the first optical waveguide 110 is made incident onto the reflection surface 255. Similarly to the positioning portion 137, the positioning portion 237 according to this modification example is a side surface of the third board 235 inserted into the opening of the optical signal transmission board 100. In a state where the side surface is in contact with a bottom surface of the opening, the positioning portion 237 does not allow the optical connection board 230 to be further inserted into the optical signal transmission board 100, thus determining the position of the reflection surface 255 with respect to the first optical waveguide 110.

As described above, the bottom surface of the opening provided in the optical signal transmission board 100 functions as a positioning plane for use in the positioning, which is parallel to the optical signal transmission board 100. Then, in a state where the optical connection board 230 is inserted into the opening of the optical signal transmission board 100 to a predetermined depth, the positioning portion 237 is in contact with an upper surface of the positioning plane, and does not allow the optical connection board 230 to be further inserted into the optical signal transmission board 100.

According to the optical signal transmission system 10 described as above, the first optical waveguide 110 disposed in the inner layer portion of the optical signal transmission board 100 can be connected to the light receiving/emitting element mounted on the surface of the light transmission board 100 by the optical connection board 230 with high coupling efficiency. Moreover, the optical connection board 230 is inserted into the optical signal transmission board 100 after the laminating step and the soldering step of components in the manufacturing process are finished, thus making it possible to prevent the second optical waveguide 250 from being affected by heat.

Note that, in place of the above, a structure may be adopted, in which the third board 235 is formed of a material serving as a cladding of the second optical waveguide 250, and the core 245 is in contact with an upper surface of the third board 235 and is extended on the upper surface. In this case, the cladding layer 240a is in contact with the upper surface of the third board 235 and an upper surface and side surface of the core 245, and serves as the cladding of the second optical waveguide 250.

Figure 3A:
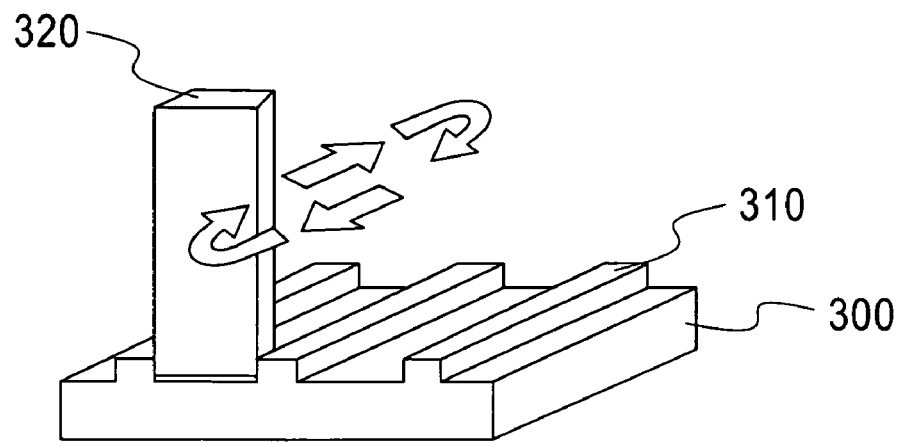
FIGS. 3(a) to 3(c) are a first group of diagrams showing a manufacturing method of an optical connection board 230.
Figure 3B:
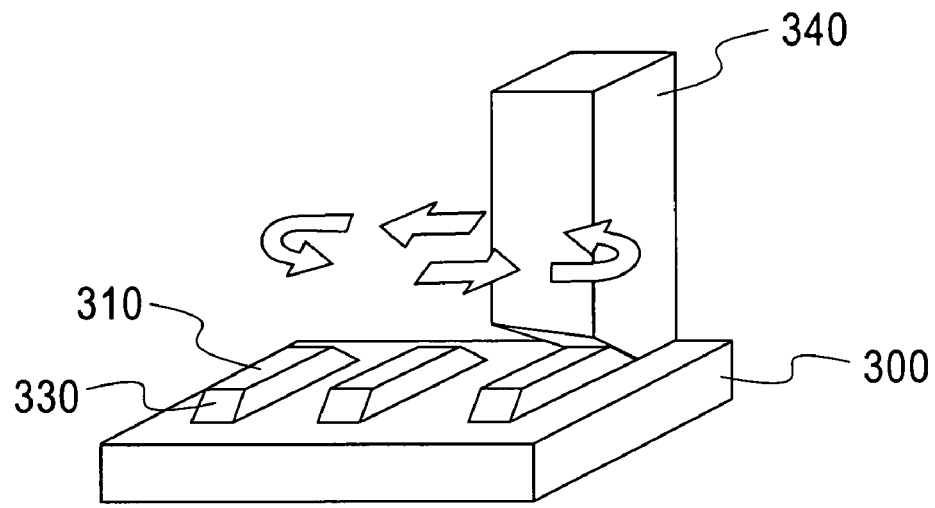
Figure 3C:
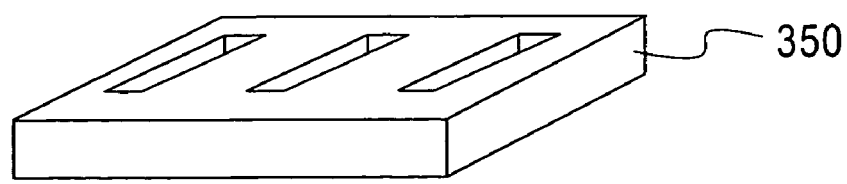

FIGS. 3(a) to 3(c) are a first group of diagrams showing a manufacturing method of the optical connection board 230. FIGS. 3(a) to 3(c) show mold fabrication steps of forming a negative mold 350 for use in forming the core 245 on the third board 235.

As shown in FIG. 3(a), first, a metal plate is cut by means of a blade 320 by using, for example, precision diamond cutting, and a positive mold 300 provided with an optical waveguide shape 310 having a shape of the cores 245 is formed. Next, as shown in FIG. 3(b), portions to be end portions of the optical waveguide shape 310 are cut by means of a blade 340, and a reflection surface shape 330 having a shape of the reflection surfaces 255 is formed on the end portions of the optical waveguide shape 310. Next, as shown in FIG. 3(c), the negative mold 350 serving as a negative mold for the positive mold 300 on which the optical waveguide shape 310 and the reflection surface shape 330 are formed is made by using, for example, electroforming, molding or the like.

Figure 4A:
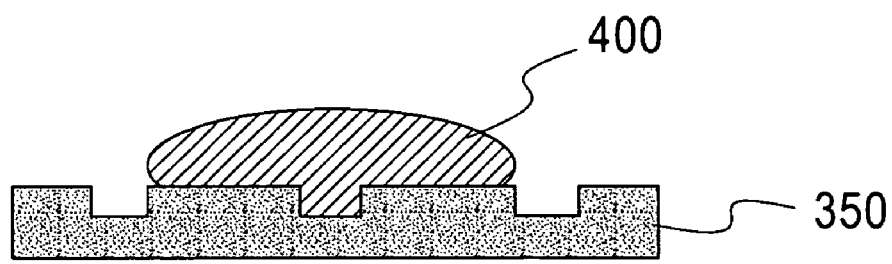
FIGS. 4(a) to 4(c) are a second group of diagrams showing the manufacturing method of an optical connection board 230.
Figure 4B:
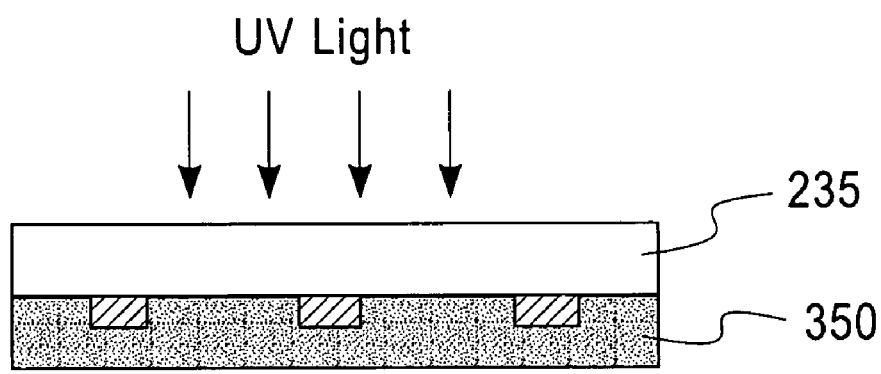
Figure 4C:
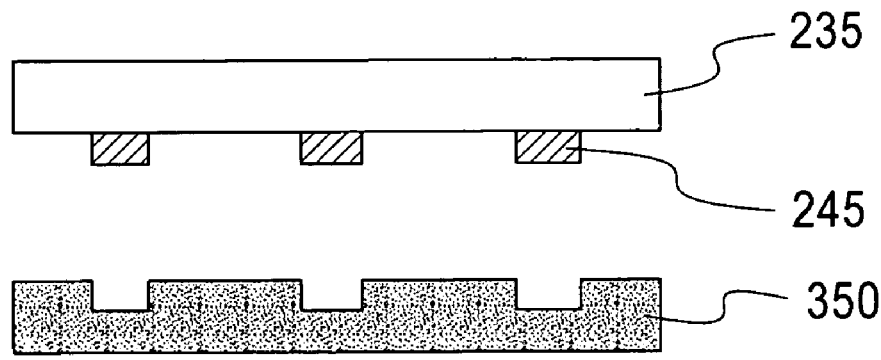

FIGS. 4(a) to 4(c) are a second group of diagrams showing the manufacturing method of the optical connection board 230. FIGS. 4(a) to 4(c) show second optical waveguide fabrication steps of forming the cores 245 on the third board 235 by using a 2P method as a molding method.

As shown in FIG. 4(a), UV curing resin 400 such as curing acrylic resin having a high refractive index is applied as mold resin on the negative mold 350. Next, as shown in FIG. 4(b), the third board 235 is pressed onto the negative mold 350 on which the UV curing resin 400 is applied, and UV light is irradiated from a back surface of the third board 235. Thus, the UV curing resin 400 is cured. In such a way, glass having a lower refractive index than the UV curing resin 400 may be used as the third board 235, the cores 245 may be provided on the upper surface of the third board 235 so as to directly be in contact therewith, and the third board 235 may be used as the cladding layer of the second optical waveguide 250. Instead of this, cladding resin having a low refractive index as compared with the UV curing resin 400 may be applied or molded on the core 245-side surface of the third board 235, and the cladding layer 240b may be formed in advance. Next, as shown in FIG. 4(c), the third board 235 in which the cores 245 are formed on the upper surface is released from the negative mold 350.

According to the second optical waveguide fabrication steps described as above, each core 245 of the second optical waveguide 250 extended on the upper surface of the third board 235 is formed by using the molding, thus making it possible to form the second optical waveguide 250. In addition, the photo-curing resin (UV curing resin 400) is used as the mold resin, and accordingly, temperature during the molding can be set substantially the same as room temperature, and heat shrinkage of the resin can be restricted to a relatively small extent. Thus, the second optical waveguide 250 can be formed with high precision. Moreover, resin excellent in heat resistance can also be used as the UV curing resin 400.

Instead of the above, in the second optical waveguide fabrication steps, the second optical waveguide 250 and the third board 235 may be integrally molded by using an injection or compression method.

Figure 5A:
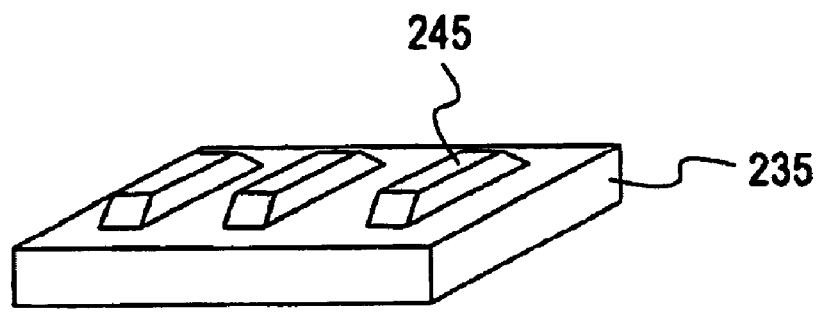
FIGS. 5(a) to 5(c) are a third group of diagrams showing the manufacturing method of an optical connection board 230.
Figure 5B:
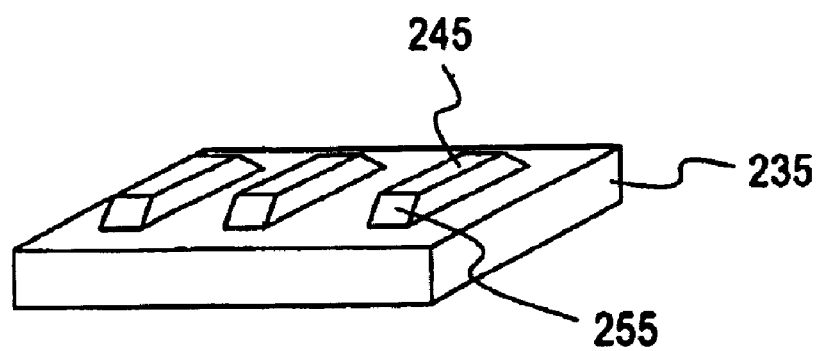
Figure 5C:
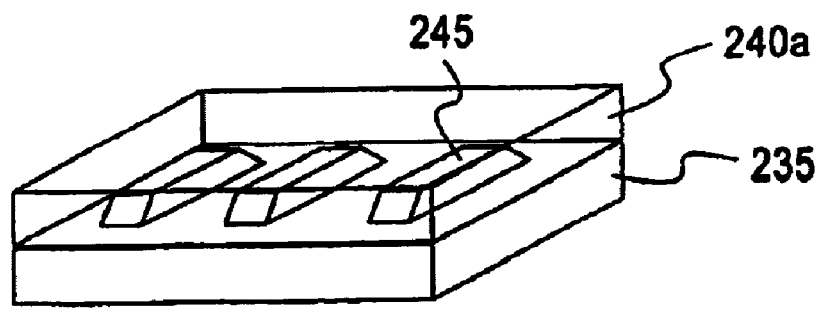

FIGS. 5(a) to 5(c) are a third group of diagrams showing the manufacturing method of the optical connection board 230.

As shown in FIG. 5(a), in the second optical waveguide fabrication steps, the one or plurality of cores 245 which are extended on the upper surface of the third board 235 and have inclined surfaces serving as the reflection surfaces 255 on the end portions are formed on the third board 235. Next, as shown in FIG. 5(b), in a reflection surface fabrication step, metal films serving as mirrors are deposited on the inclined surfaces on the end portions of the cores 245 by using mask deposition or the like, and the reflection surfaces 255 are formed on the end portions of the second optical waveguides 250.

Next, as shown in FIG. 5(c), in a cladding layer fabrication step, the cladding layer 240a which is in contact with the cores 245 and the upper surface of the third board 235 and serves as the claddings of the second optical waveguides 250 is formed, by means of coating the resin as the cladding material on the upper surface of the third board 235, by means of forming the cladding layer on the upper surface of the third board 235 by using the 2P mold method, or the like.

According to the above-described manufacturing method shown in FIGS. 3(a) to 5(c), an optical connection board 230 having a similar function to that of the optical connection board 230 shown in FIG. 2 can be fabricated.

In the case of fabricating an optical connection board 230 having the same structure as the optical connection board 230 shown in FIG. 2, the respective manufacturing steps described above are changed shown as below. First, the step of forming the reflection surface shape 330, which is shown in FIG. 3(b), is not performed, but a positive mold 300 provided with a reflection surface shape 330 that does not have the shape of the reflection surfaces 255 on the end portions of the optical waveguide shape 310 is formed. Thus, in FIG. 5(a), cores 245 that do not have the inclined surfaces serving as the reflection surfaces 255 on the end portions are obtained. Next, the reflection surface fabrication step shown in FIG. 5(b) is omitted, and the cladding layer 240a is formed by the cladding layer fabrication step shown in FIG. 5(c).

Thereafter, the cladding layers 240a and 240b and the cores 245 to be the end portions of the second optical waveguides 250 are cut, and the inclined surfaces to be the reflection surfaces 255 are formed. Next, the metal films are deposited on the inclined surfaces by using the mask deposition, and the reflection surfaces 255 are formed. At this stage, spaces on the opposite of the cores 245 with respect to the reflection surfaces 255 are in a state of being cut away when the inclined surfaces are formed. The optical connection board 230 may be inserted into the optical signal transmission board 100 in this state. Alternatively, the optical connection board 230 may be inserted into the optical signal transmission board 100, after the portions cut for forming the inclined surfaces serving as the reflection surfaces are filled with resin or the like.

According to the manufacturing process thus changed, the optical connection board 230 having the same structure as that shown in FIG. 2 can be fabricated.

Figure 6A:
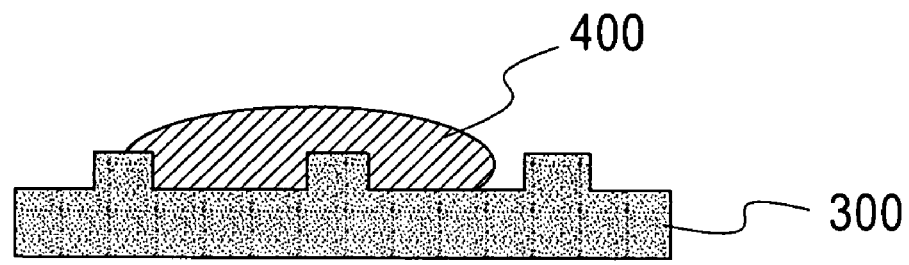
FIGS. 6(a) to 6(c) are a first group of diagrams showing a manufacturing method of an optical connection board 130 according to the embodiment of the present invention.
Figure 6B:
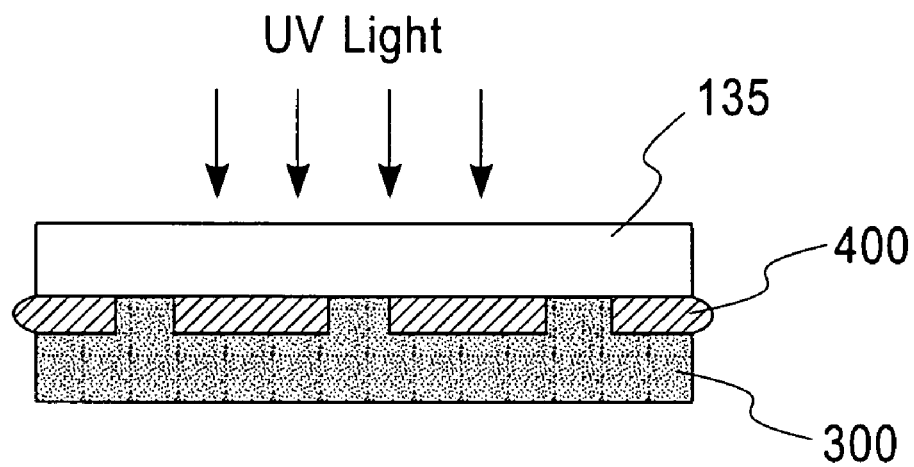
Figure 6C:
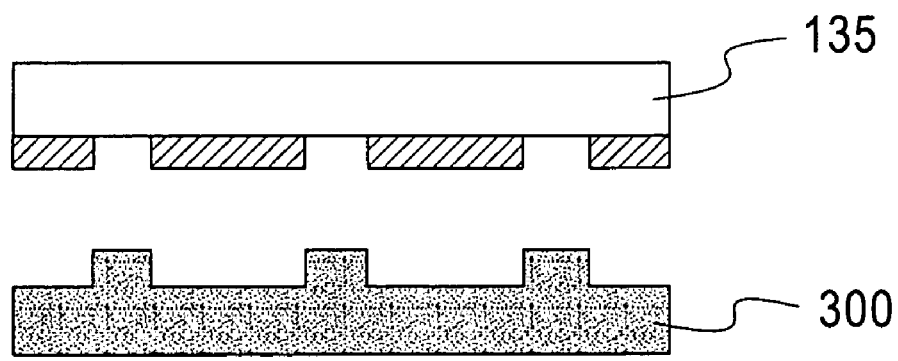

FIGS. 6(a) to 6(c) are a first group of diagrams showing a manufacturing method of the optical connection board 130 according to this embodiment. FIGS. 6(a) to 6(c) show first cladding layer fabrication steps of forming the cladding layer 140b on the third board 135 by using the 2P method as the molding method.

First, as shown in FIG. 6(a), the UV curing resin 400 is applied on the positive mold 300 fabricated in the step of FIG. 3(b) in a similar way to that in FIG. 4(a). Next, as shown in FIG. 6(b), the third board 135 is pressed onto the positive mold 300 on which the UV curing resin 400 is applied, and UV light (ultraviolet rays) is irradiated from a back surface of the third board 135. In such a way, the UV curing resin 400 is cured. In order to perform the processing as described above, it is preferable to use an optically transparent board as the third board 135. Accordingly, in a similar way to the step of FIG. 4(b), glass having a lower refractive index than the UV curing resin 400 may be used, and the third board 135 may be used as a cladding layer of the second optical waveguide 150.

Instead of this, the cladding layer 140a may be formed in advance on the surface of the core 145-side of the third board 135. Next, as shown in FIG. 6(c), the third board 135 in which the cladding layer 140a is formed on the upper surface is released from the positive mold 300. Moreover, the third board 135 and the cladding layer 140a may be formed integrally by using the injection method and the like.

FIGS. 7(a) to 7(d) are a second group of diagrams showing the manufacturing method of the optical connection board 130 according to this embodiment.

Figure 7A:
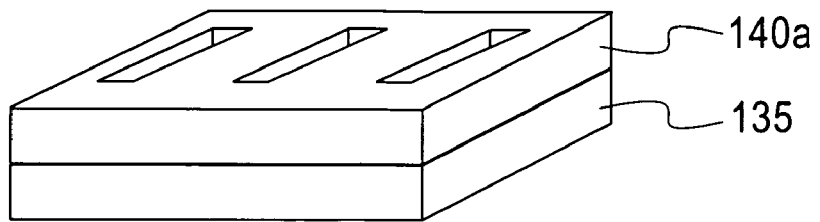
FIGS. 7(a) to 7(d) are a second group of diagrams showing the manufacturing method of an optical connection board 130 according to the embodiment of the present invention.
Figure 7B:
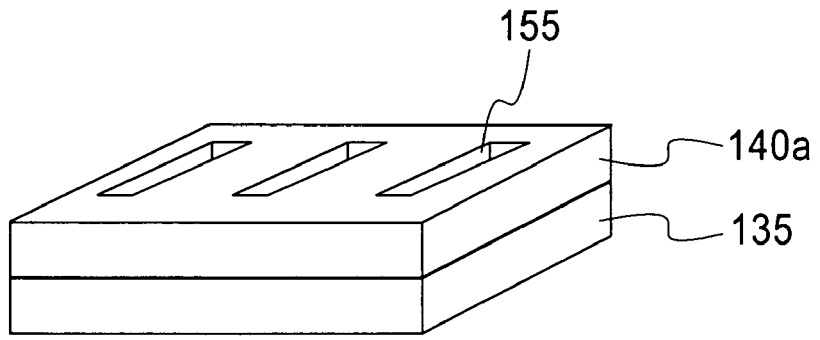

As shown in FIG. 7(a), in the first cladding layer fabrication step, the cladding layer 140a having groove portions in which inner walls are formed in a shape of the cores of the second optical waveguides 150 and serving as the claddings of the second optical waveguides 150 is formed on the upper surface of the third board 135. Next, as shown in FIG. 7(b), in the reflection surface fabrication step, metal films serving as mirrors are deposited on end portions of the groove portions provided in the cladding layer 140a by using the mask deposition or the like, and thus the reflection surfaces 155 are formed on the end portions of the second optical waveguides 150.

Figure 7C:
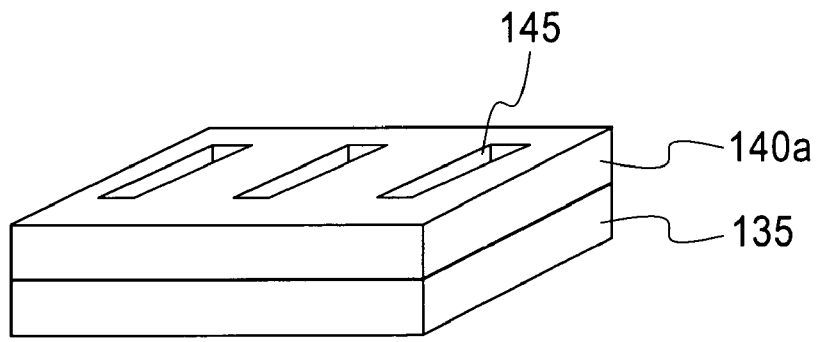
Figure 7D:
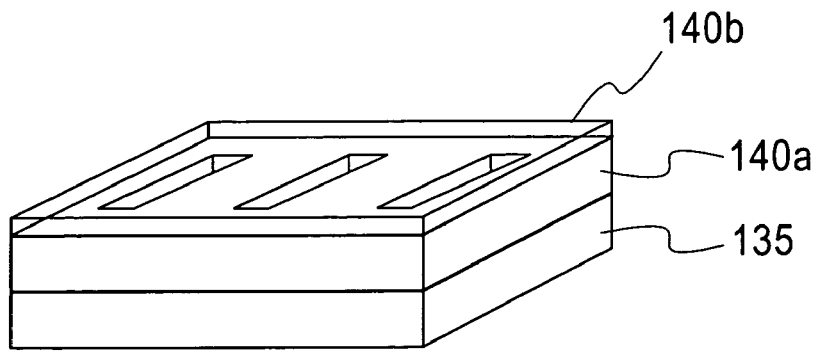

Next, as shown in FIG. 7(c), in the second optical waveguide fabrication steps, the groove portions of the cladding layer 140a are filled with a core material such as resin, and the cores 145 of the second optical waveguides 150 are formed. Then, surplus resin is removed by a squeegee and the like, optical surfaces are formed by means of surface tension of the resin, and the resin is cured by light or heat. Instead of this, an optical plane may be formed by the 2P method and the like by using a plane mold and the like. Next, as shown in FIG. 7(d), in the second cladding layer fabrication step, the cladding layer 140b serving as claddings of the second optical waveguides 150 are formed on the upper surface of the cladding layer 140a in which the groove portions are filled with the core material.

Figure 14:
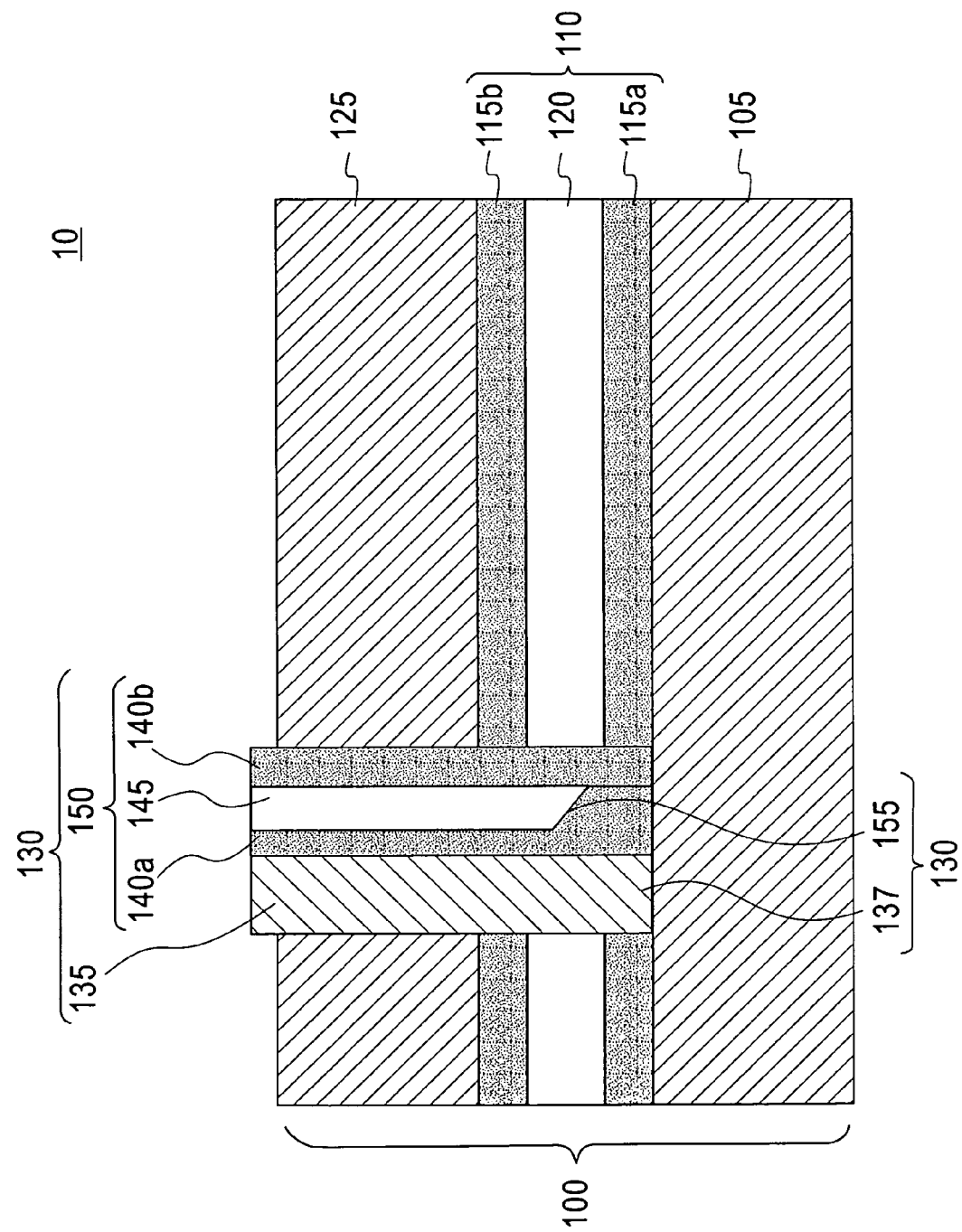
FIG. 14 shows a configuration of an optical signal transmission system 10 according to a sixth modification example of the embodiment of the present invention.

According to the above-described manufacturing method shown in FIGS. 6(a) to 7(d), similarly to the optical connection board 130 shown in FIG. 1, the optical connection board 130 adopting the structure in which the light traveling through the second optical waveguide is reflected by the reflection surface 155 in the direction away from the third board 135 can be fabricated. More specifically, an optical connection board 130 shown in FIG. 14 can be fabricated by the manufacturing method shown in FIGS. 6(a) to 7(d). The optical connection board 130 shown in FIG. 14 comprises a third board 135, a cladding layer 140a which is in contact with the upper surface of the third board 135 and serves as the cladding of the second optical waveguide 150, a core 145 formed in the groove portion provided on the cladding layer 140a, a reflection surface 155 formed on an end portion of the groove portion provided on the cladding layer 140a, and a cladding layer 140b formed on upper surfaces of the cladding layer 140a and core 145. In this feature, the light traveling through the second optical waveguide 150 is reflected by the reflection surface 155, transmitted through the cladding layer 140b, and made incident onto the first optical waveguide 110. Meanwhile, the light incident from the first optical waveguide 110 onto the second optical waveguide 150 is transmitted through the cladding layer 140b, is reflected by the reflection surface 155, and travels through the second optical waveguide 150.

Instead of the above, in the case of fabricating an optical connection board 130 having the same structure as the optical connection board 130 shown in FIG. 1, the respective manufacturing steps described above are changed shown as below. First, the step of forming the reflection surface shape 330, which is shown in FIG. 3(b), is not performed, but the positive mold 300 provided with the reflection surface shape 330 that does not have the shape of the reflection surfaces 155 on the end portions of the optical waveguide shape 310 is formed. Thus, in FIG. 7(a), a cladding layer 140a that does not have the inclined surfaces to be the reflection surfaces 155 on the end portions is obtained. Next, the reflection surface fabrication step shown in FIG. 7(b) is omitted, and the cladding layer 140 is formed by the second optical waveguide fabrication step shown in FIG. 7(c) and the second cladding layer fabrication step shown in FIG. 7(d).

Thereafter, the cladding layers 140a and 140b and the cores 145 in the portions to be the end portions of the second optical waveguides 150 are cut, and the inclined surfaces to be the reflection surfaces 155 and spaces to be provided with the connection portions 160 are formed. Next, the metal films are deposited on the inclined surfaces by using the mask deposition, and the reflection surfaces 155 are formed. Then, the spaces to be provided with the connection portions 160 are filled with the core material, and the connection portions 160 are formed.

According to the manufacturing process thus changed, the optical connection board 130 having the same structure as that shown in FIG. 1 can be fabricated.

Figure 8A:
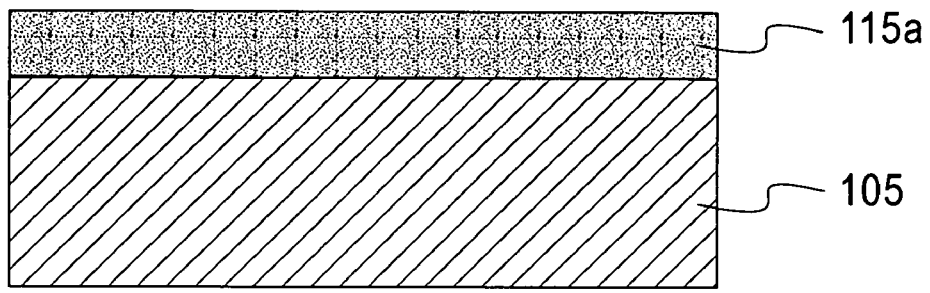
FIGS. 8(a) to 8(c) are a first group of diagrams showing a manufacturing method of an optical signal transmission board 100 according to this embodiment of the present invention.
Figure 8B:
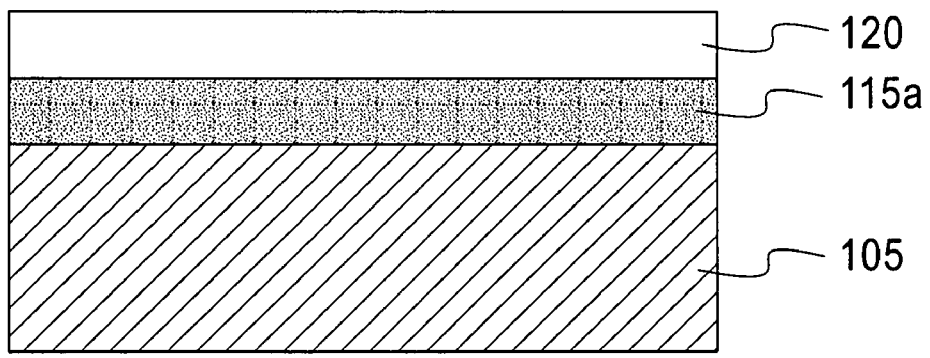
Figure 8C:
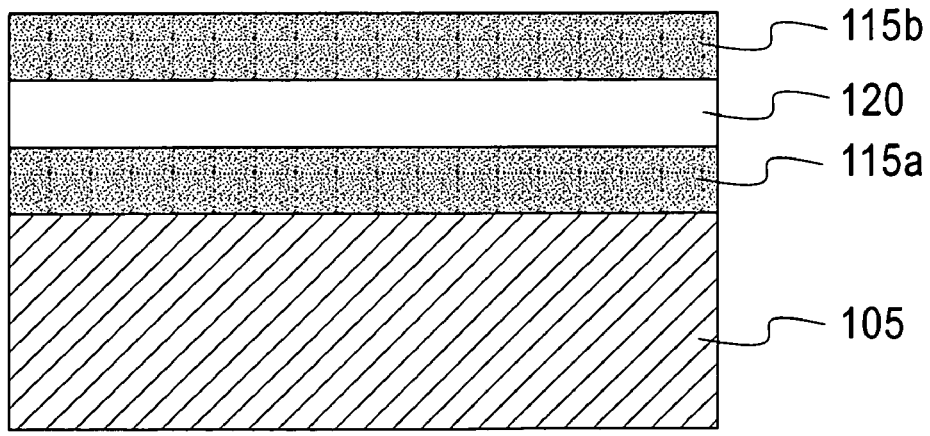

FIGS. 8(a) to 8(c) are a first group of diagrams showing a manufacturing method of the optical signal transmission board 100 according to this embodiment. FIGS. 8(a) to 8(c) show a first cladding layer fabrication step, a core fabrication step, and a second cladding layer fabrication step in optical signal transmission board fabrication process of the optical signal transmission board 100, respectively.

First, as shown in FIG. 8(a), in the first cladding layer fabrication step, the cladding layer 115a is formed on the upper surface of the first board 105. Next, as shown in FIG. 8(b), in the core fabrication step, the core 120 extended on the upper surface of the cladding layer 115a is formed. Next, as shown in FIG. 8(c), in the second cladding layer fabrication step, the cladding layer 115b is formed so as to cover the upper surface of the cladding layer 115a and the upper and side surfaces of the core 120.

Figure 9A:
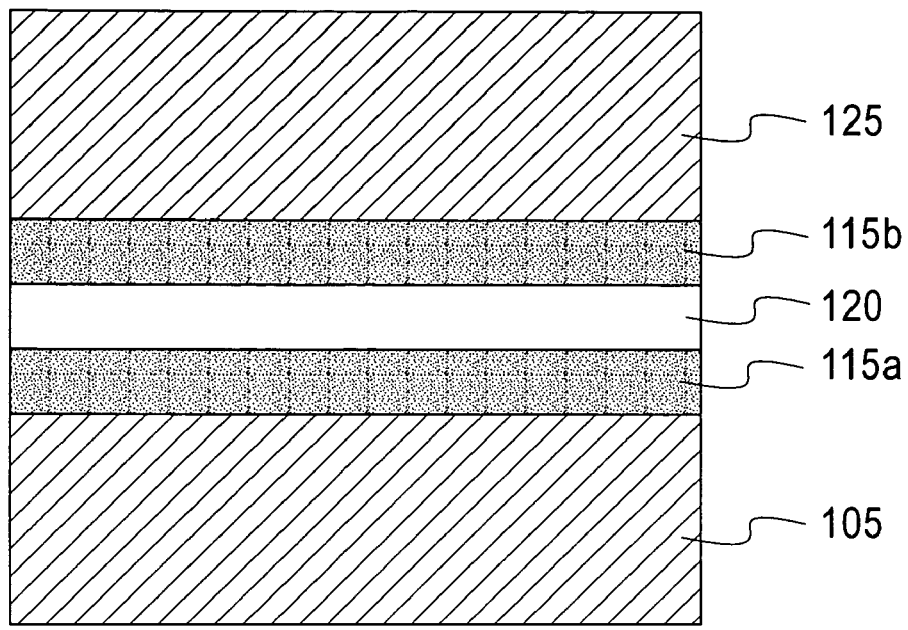
FIGS. 9(a) and 9(b) are a second group of diagrams showing the manufacturing method of an optical signal transmission board 100 according to this embodiment of the present invention.
Figure 9B:
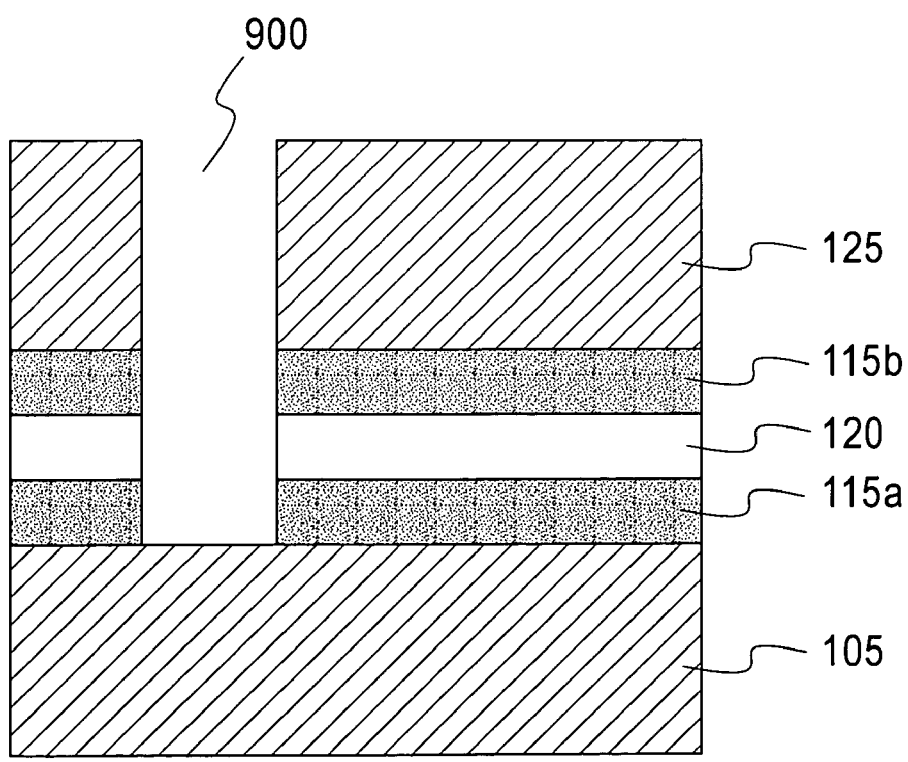

FIGS. 9(a) and 9(b) are a second group of diagrams showing the manufacturing method of the optical signal transmission board 100 according to this embodiment. Next, as shown in FIG. 9(a), in an upper board laminating step in the optical signal transmission board fabrication process, the second board 125 is stacked on the upper surface of the cladding layer 115b. Next, as shown in FIG. 9(b), in an opening fabrication step, an opening 900 extended from the upper surface of the optical signal transmission board 100 toward the first board 105 and having a sidewall to which the end portion of the first optical waveguide 110 is exposed, is formed.

As described above, according to the manufacturing process shown in FIGS. 8(a) to 9(b), the optical signal transmission board 100 can be fabricated. Thereafter, in an optical connection board insertion step, the optical connection board 130 or the optical connection board 230 is inserted into the opening 900 of the optical signal transmission board 100. Then, on the light emitting side, the reflection surface 155 and the like are arranged at the positions where the light traveling through the second optical waveguide 150 and the like and reflected by the reflection surface 155 and the like is incident onto the core 120 extended in the direction substantially perpendicular to the third board 135 and the like. Moreover, on the light receiving side, the reflection surface 155 and the like are arranged at the positions where the light emitted from the first optical waveguide 110 extended in the direction substantially perpendicular to the third board 135 and the like and reflected by the reflection surface 155 and the like is incident onto the second optical waveguide 150.

In the above description, the laminating of boards for the optical signal transmission board 100 may be performed after the upper board laminating step shown in FIG. 9(a) and before the opening fabrication step shown in FIG. 9(b). Thus, the first optical waveguide 110 can be prevented from being damaged by heat treatment in the laminating step. Moreover, the soldering process of the electronic components on the upper or lower surface of the optical signal transmission board 100 may be performed after the opening fabrication step shown in FIG. 9(b) and before the optical connection board insertion step. Thus, the second optical waveguide 150 or the second optical waveguide 250 can be prevented from being affected by heat due to the soldering process.

Moreover, prior to the above-described optical connection board insertion step, as a transparent resin injection step, transparent resin filling a gap between the optical signal transmission board 100 and the second optical waveguide 150 or the second optical waveguide 250 may be injected into the opening 900 of the optical signal transmission board 100. Then, after the second optical waveguide 150 or the second optical waveguide 250 is inserted into the opening 900, curing treatment for this transparent resin may be performed. As a result of this, the optical signal transmission system 10 is configured by further comprising the transparent resin injected into the opening 900 of the optical signal transmission board 100 and filling the gap between the optical signal transmission board 100 and the second optical waveguide 150 or the second optical waveguide 250.

In such a way, the gap between the optical signal transmission board 100 and the second optical waveguide 150 or the second optical waveguide 250 is filled with the transparent resin having substantially the same refractive index as those of the core 145 and core 120. Thus, even in the case where the surface of the sidewall of the opening 900 is not optically smooth (uniform) in the opening fabrication step, irregularities on the surface can be smoothed, and the core 120 and the core 145 can be connected with each other with high optical coupling efficiency. Hence, even in the case where the opening 900 is formed by machining in the opening fabrication step, sufficient coupling efficiency can be obtained.

Figure 10:
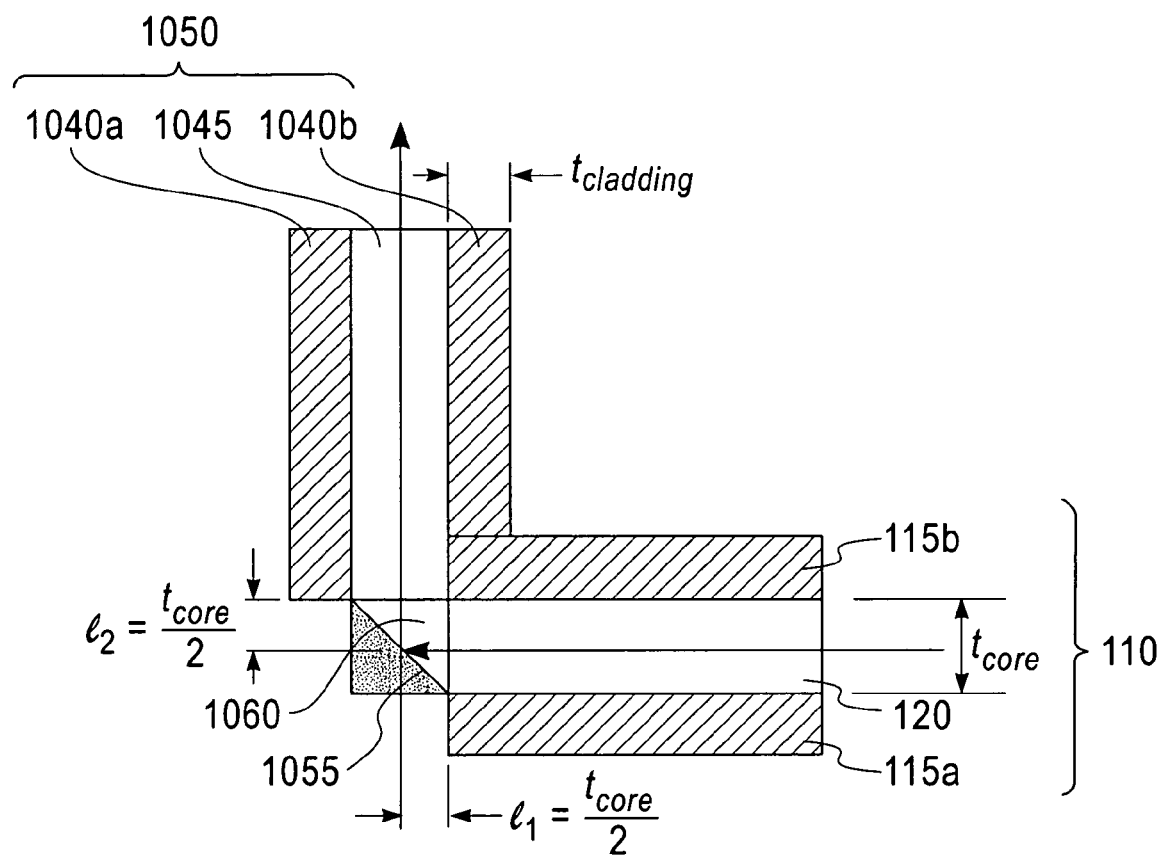
FIG. 10 shows a connection structure of optical waveguides according to a second modification example of the embodiment of the present invention.

FIG. 10 shows a connection structure of optical waveguides according to a second modification example of this embodiment. In FIG. 10, the first optical waveguide 110, a second optical waveguide 1050, a reflection surface 1055 and a connection portion 1060 are illustrated, and for example, illustration of members in FIG. 1, such as the first board 105, the second board 125 and the third board 135, is omitted.

The second optical waveguide 1050 according to the second modification example comprises cladding layers 1040a and 1040b corresponding to the cladding layers 140a and 140b of FIG. 1, and a core 1045 corresponding to the core 145 of FIG. 1, and has a similar structure to that of the second optical waveguide 150 of FIG. 1 except for the following point. The second optical waveguide 1050 in the second modification example adopts a structure in which the cladding layer 1040b in an end portion of the second optical waveguide 1050 is partially stripped off and a side surface of an end portion of the cladding layer 1040b is in contact with an upper surface of the cladding layer 115b. Thus, a structure can be adopted, in which the cladding layer 1040b-side of the core 1045 and a cladding layer 115b-side of the core 120 are in contact with each other substantially. Then, a centerline of the core 1045 can be made close to the end portion of the core 120.

The reflection surface 1055 and the connection portion 1060 correspond to the reflection surface 155 and connection portion 160 of FIG. 1, respectively. The reflection surface 1055 according to the second modification example is an inclined plane of which both ends are connected to an end portion on the cladding layer 1040a-side of the core 1045 and an end portion on the cladding layer 115b-side of the core 120. Thus, a distance in which light exchanged between the core 1045 and the core 120 passes through the connection portion 1060 can be suppressed to be short. For this reason, the coupling efficiency of the light between the core 1045 and the core 120 can be increased, and crosstalk between a plurality of the cores 1045 and a plurality of the cores 120 can be restricted.

In FIG. 10, when the core 1045 and the core 120 have the same dimension, a traveling distance of the light between end surfaces of the core 1045 and core 120, that is, a distance in which the light passes through the connection portion 1060 between the core 1045 and the core 120, can be represented by the following Expression (1)

$$l = l_1 + l_2 = \frac{t_{core}}{2} + \frac{t_{core}}{2} = t_{core}$$

where $t_{core}$ is heights of the core 1045 and core 120, $l_1$ is a distance between the center of the end portion of the core 120 and the reflection surface 1055 in a direction parallel to the core 120, and $l_2$ is a distance between the center of the end portion of the core 1045 and the reflection surface 1055 in a direction parallel to the core 1045.

Figure 11:
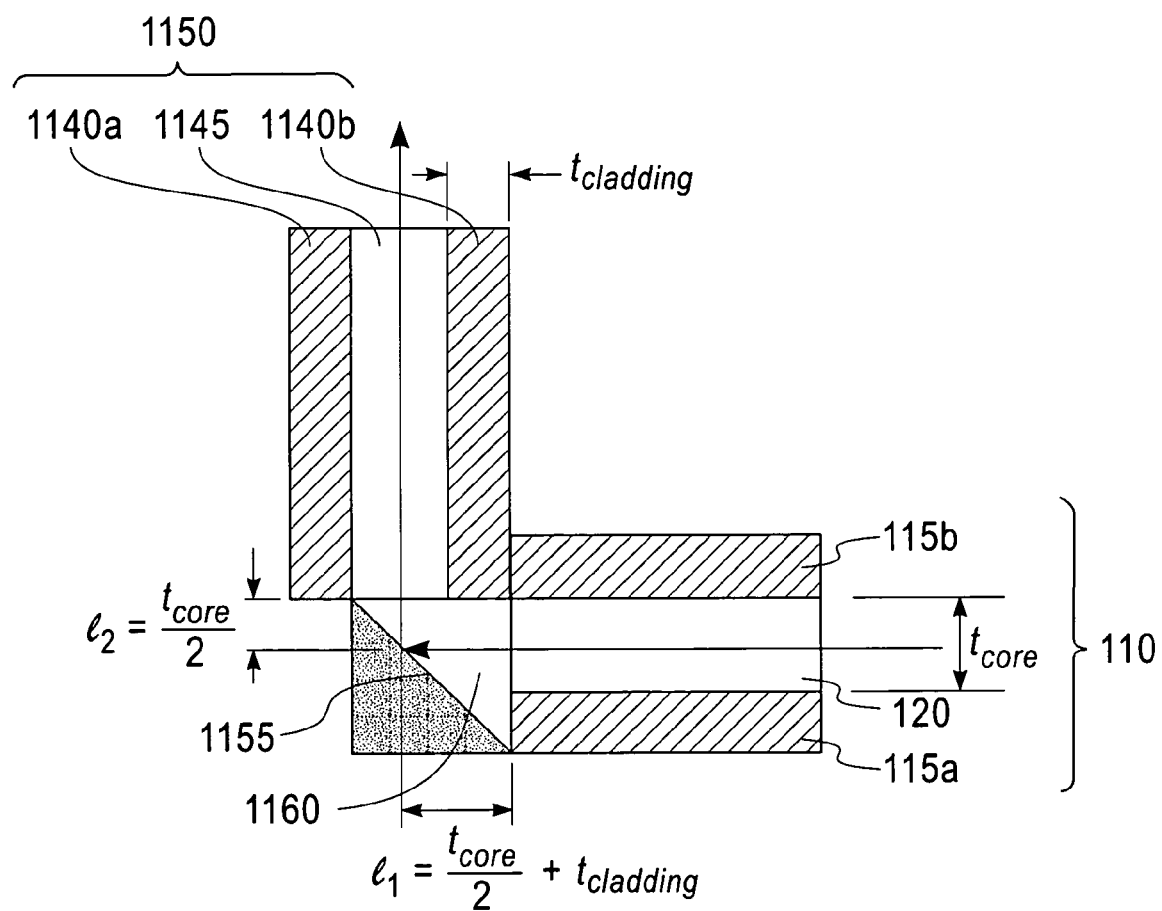
FIG. 11 shows a connection structure of optical waveguides according to a third modification example of the embodiment of the present invention.

FIG. 11 shows a connection structure of optical waveguides according to a third modification example of this embodiment. In FIG. 11, the first optical waveguide 110, a second optical waveguide 1150, a reflection surface 1155 and a connection portion 1160 are illustrated, and for example, illustration of members in FIG. 1, such as the first board 105, the second board 125 and the third board 135, is omitted.

The second optical waveguide 1150 according to the third modification example comprises cladding layers 1140a and 1140b corresponding to the cladding layers 140a and 140b of FIG. 1, and a core 1145 corresponding to the core 145 of FIG. 1. The second optical waveguide 1150 according to the third modification example adopts a structure, in which an end surface of the second optical waveguide 1150 is located on an extension of a lower surface of the cladding layer 115b, and the cladding layer 1140b is located between the core 1145 and the cladding layer 115b.

The reflection surface 1155 and the connection portion 1160 correspond to the reflection surface 155 and connection portion 160 of FIG. 1, respectively. The reflection surface 1155 according to the third modification example is an inclined plane of which both ends are connected to an end portion on the cladding layer 1140a-side of the core 1145 and a lower end portion of the cladding layer 115a. Moreover, the connection portion 1160 is provided to be in contact with end surfaces of the core 1145 and cladding layer 1140b and on end surfaces of the core 120 and cladding layer 115a.

In FIG. 11, when the core 1145 and the core 120 have the same dimension, a traveling distance of the light between end surfaces of the core 1145 and core 120 can be represented by the following Expression (2).

$$l = l_1 + l_2 = \frac{t_{core}}{2} + t_{cladding} + \frac{t_{core}}{2} = t_{core} + t_{cladding} \cdots$$

where $t_{core}$ is heights of the core 1145 and core 120, $l_1$ is a distance between the center of the end portion of the core 120 and the reflection surface 1155 in a direction parallel to the core 120, $l_2$ is a distance between the center of the end portion of the core 1145 and the reflection surface 1155 in a direction parallel to the core 1145, and $t_{cladding}$ is a thickness of the cladding layer 1140b.

At present, in general, the height $t_{core}$ of the cores is set at several ten microns in the multimode optical waveguide. When the thickness $t_{cladding}$ of the cladding layer is set at several ten microns to a similar extent, the traveling distance l of the light between the end surfaces of the cores becomes approximately 100 microns. In this case, divergence of the light is represented as:

l·sin θ=l·NA=0.02 mm

Hence, even if the distance between the optical waveguides is reduced to less than 0.25 mm that is a pitch of a current optical fiber array, a crosstalk between the optical waveguides can be suppressed to be sufficiently small.

As described above, according to the connection structure of the optical waveguides, which is shown in FIG. 11, though the traveling distance of the light between the end surfaces of the cores becomes somewhat long as compared with that of the connection structure shown in FIG. 10, the crosstalk between the optical waveguides can be suppressed to be sufficiently small. Furthermore, step of stripping off a part of the end portion of the cladding layer 1040b can be eliminated, and a structure easy to manufacture and assemble can be obtained.

Figure 12:
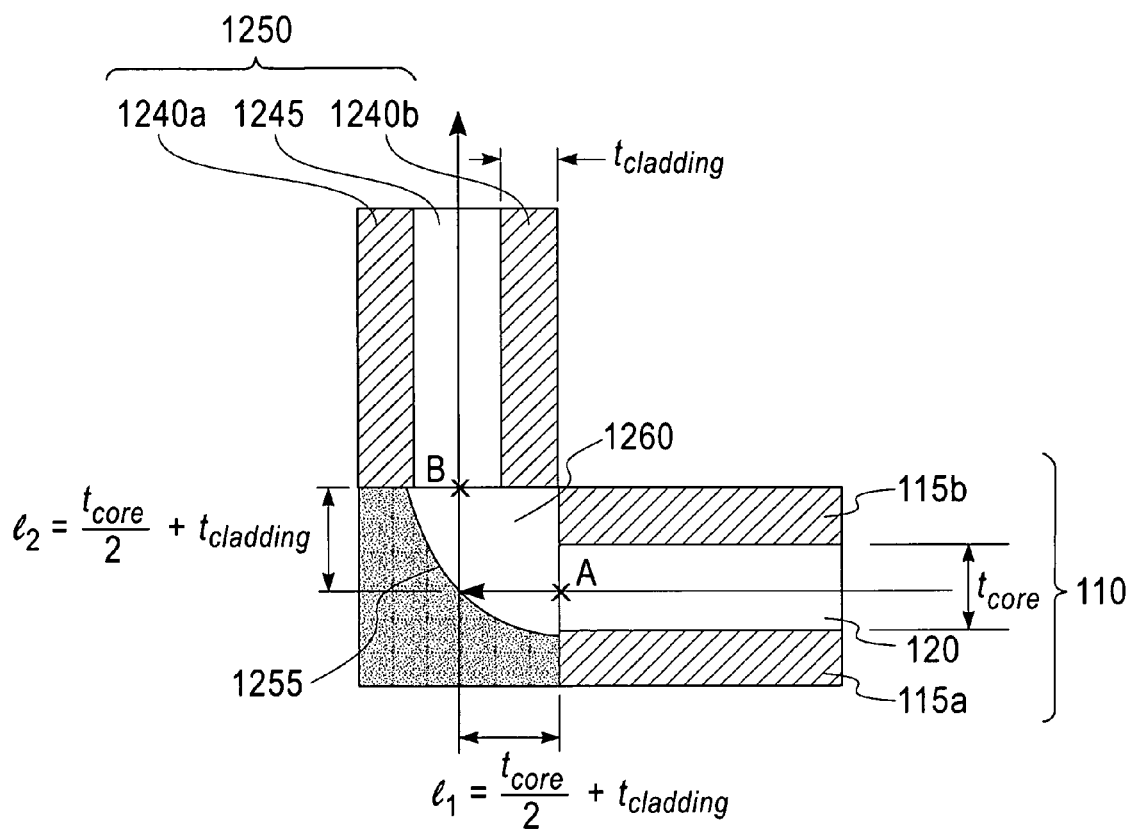
FIG. 12 shows a connection structure of optical waveguides according to a fourth modification example of the embodiment of the present invention.

FIG. 12 shows a connection structure of optical waveguides according to a fourth modification example of this embodiment. In FIG. 12, the first optical waveguide 110, a second optical waveguide 1250, a reflection surface 1255 and a connection portion 1260 are illustrated, and for example, illustration of members in FIG. 1, such as the first board 105, the second board 125 and the third board 135, is omitted.

In the third modification example, though the crosstalk between the optical waveguides can be made sufficiently small, a part of the light emitted from one optical waveguide is not incident onto the other optical waveguide, and a coupling loss occurs therebetween. In order to reduce this coupling loss, in the fourth modification example, the reflection surface provided between the two optical waveguides is made as a light collecting optical system.

The second optical waveguide 1250 according to the fourth modification example comprises cladding layers 1240a and 1240b corresponding to the cladding layers 140a and 140b of FIG. 1, and a core 1245 corresponding to the core 145 of FIG. 1. The second optical waveguide 1250 according to the fourth modification example adopts a structure, in which an end surface of the second optical waveguide 1250 is located on an extension of an upper surface of the cladding layer 115b.

The reflection surface 1255 and the connection portion 1260 correspond to the reflection surface 155 and connection portion 160 of FIG. 1, respectively. The reflection surface 1255 according to the fourth modification example has a concave shape, and more specifically, has a spheroidal surface shape C in which approximate center points of an end portion of the reflection surface 1255 and of an end portion of the core 120, that is points A and B in FIG. 12, are set as focal points. Thus, light emitted from one optical waveguide is collected and made incident onto the approximate center point of the core in the end portion of the other optical waveguide. As a result of this, the coupling efficiency of the light can be increased.

In FIG. 12, when the core 1245 and the core 120 have the same dimension, a traveling distance of the light between end surfaces of the core 1245 and core 120 can be represented by the following Expression (3).

$$l = l_1 + l_2 = 2 \times \left( \frac{t_{core}}{2} + t_{cladding} \right) = t_{core} + 2 \cdot t_{cladding} \quad \ldots$$

where $t_{core}$ is heights of the core 1245 and core 120, $l_1$ is a distance between the center of the end portion of the core 120 and the reflection surface 1255 in a direction parallel to the core 120, $l_2$ is a distance between the center of the end portion of the core 1245 and the reflection surface 1255 in a direction parallel to the core 1245, and $t_{cladding}$ is thicknesses of the cladding layer 1240b and cladding layer 115b.

As described above, according to the connection structure shown in FIG. 12, though the traveling distance of the light between the end surfaces of the cores becomes long as compared with that of the connection structures shown in FIGS. 10 and 11, the reflection surface 1255 is made as the light collecting optical system, thus making it possible to obtain high coupling efficiency.

The reflection surface described above can be fabricated by a method shown as below. First, in the mold fabrication step shown in FIG. 3(b), the portion to be the end portion of each optical waveguide 310 is cut by means of the blade 340, and the reflection surface shape 330 having a convex shape corresponding to the reflection surface 155 or the reflection surface 255 is formed on the end portion of the optical waveguide shape 310. Then, in the second optical waveguide fabrication steps shown in FIGS. 4(a) to 4(c), the UV curing resin 400 is molded by the negative mold 350 for the reflection surface shape 330. Alternatively, in the second optical waveguide fabrication steps shown in FIGS. 6(a) to 6(c), the UV curing resin 400 is molded into the reflection surface shape 330. Thus, the reflection surface having the concave shape on each end portion of the second optical waveguide 250 or second optical waveguide 150 can be formed.

Figure 13:
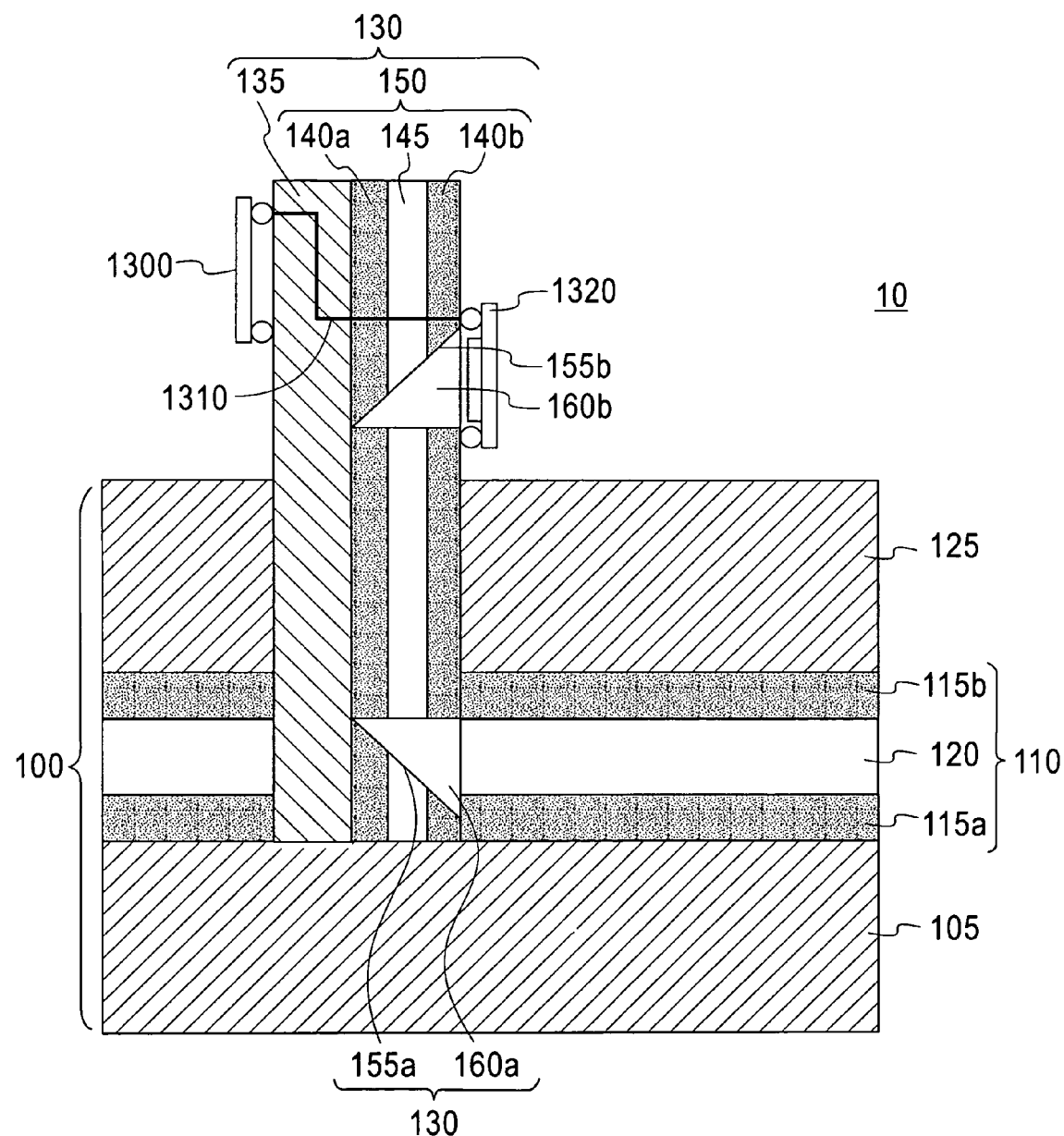
FIG. 13 shows a configuration of an optical signal transmission system 10 according to a fifth modification example of the embodiment of the present invention.

FIG. 13 shows a configuration of an optical signal transmission system 10 according to a fifth modification example of this embodiment. The optical signal transmission system 10 according to this modification example adopts a structure modified from the optical signal transmission system 10 shown in FIG. 1, and accordingly, description thereof will be omitted except for the following difference.

An optical connection board 130 according to this modification example further comprises a light receiving/emitting element 1320, a pair of a reflection surface 155b and a connection portion 160b, an electronic device 1300, and wiring 1310. The light receiving/emitting element 1320 is mounted on the optical connection board 130, and functions as a light emitting unit and/or a light receiving unit. The light receiving/emitting element 1320 according to this modification example is mounted on the upper surface of the cladding layer 140b. However, instead of this, the light receiving/emitting element 1320 may be mounted on a surface of the third board 135, which is opposite with the second optical waveguide 150.

The reflection surface 155b and the connection portion 160b have similar functions and configurations to those of the reflection surface 155a and connection portion 160a. The reflection surface 155b and the connection portion 160b function as a light guide unit for making an optical signal outputted by the light receiving/emitting element 1320 incident onto an end portion of the second optical waveguide 150, which is opposite with the first optical waveguide 110, and for inputting an optical signal incident from the second optical waveguide 150 to the light receiving/emitting element 1320. The reflection surface 155b and the connection portion 160b exchange the optical signals between the light receiving/emitting element 1320 mounted on an upper surface of the cladding layer 140b and the second optical waveguide 150. However, instead of this, the optical signals may be exchanged with a light receiving/emitting element 1320 mounted on a surface of the third board 135, which is opposite with the second optical waveguide 150.

The reflection surface 155a is provided in an end portion on the first optical waveguide 110-side of the second optical waveguide 150. The reflection surface 155a reflects the optical signal traveling through the second optical waveguide 150 and makes the reflected optical signal incident onto the first optical waveguide 110. Meanwhile, the reflection surface 155a reflects the optical signal incident from the first optical waveguide 110 and makes the reflected optical signal incident onto the second optical waveguide 150.

The electronic device 1300 is mounted on the optical connection board 130. The electronic device 1300 according to this modification example is mounted on the surface of the third board 135, which is opposed with the second optical waveguide 150. However, instead of this, the electronic device 1300 may be mounted on the upper surface of the cladding layer 140b. The wiring 1310 connects the electronic device 1300 and the light receiving/emitting element 1320 to each other. In this modification example, the wiring 1310 is provided so as to pass on the surface of the third board 135 or through an inner layer thereof. The wiring 1310 connected to the light receiving/emitting element 1320 for use as the light emitting unit inputs, to the light receiving/emitting element 1320, an electric signal outputted from the electronic device 1300, and the inputted electric signal is converted into an optical signal by the light receiving/emitting element 1320. Moreover, the wiring 1310 connected to the light receiving/emitting element 1320 for use as the light receiving unit inputs, to the electronic device 1300, an electric signal outputted based on the optical signal received by the light receiving/emitting element 1320.

In the above description, when the electronic device 1300 has a plurality of terminals for use in parallel transmission, a plurality of the light receiving/emitting elements 1320 may convert a plurality of electric signals outputted from the plurality of terminals into a plurality of optical signals, and a plurality of the second optical waveguides 150 and a plurality of the first optical waveguides 110 may transmit the plurality of optical signals so as to make the optical signals incident onto the plurality of light receiving elements, respectively. In this case, for the purpose of densification, it is desirable that the plurality of second optical waveguides 150 and the plurality of first optical waveguides 110 adopt structures of being extended parallel to one another in the optical connection board 130 and the optical signal transmission board 100, respectively.

In a similar way to the above, the electronic device 1300, the wiring 1310 and the light receiving/emitting element 1320 can also be mounted on the optical connection board 230. Specifically, for example, the electronic device 1300 and the light receiving/emitting element 1320 may be mounted on the surface of the third board 235, which is opposite with the second optical waveguide 250, a reflection surface for exchanging the light between the light receiving/emitting element 1320 and the second optical waveguide 250 may be provided similarly to the reflection surface 255, and the wiring 1310 may be provided on the surface of the third board 235 or in the inner layer thereof.

According to the optical signal transmission system 10 described above, the first optical waveguide 110 disposed in the inner layer portion of the optical signal transmission board 100 and the light receiving/emitting element mounted on the surface-side of the optical signal transmission board 100 can be connected to each other with high coupling efficiency by the optical connection board 130 or the optical connection board 230. Here, the light receiving/emitting element may be mounted after completing the board by inserting the optical connection board 130 or the optical connection board 230 into the opening provided in the optical signal transmission board 100. Alternatively, it is also possible to provide the light receiving/emitting element with the optical connection board 130 or the optical connection board 230, and to insert it into the opening of the optical signal transmission board 100 at the stage of mounting components.

Moreover, the reflection surface 155 and the like are molded integrally with a light guiding optical system such as the optical connection board 130, and thus the reflection surface 155 and the like can be formed more easily and precisely as compared with the case of forming the reflection surface 155 and the like in the inner layer of the optical signal transmission board 100 having large size and thickness. Moreover, for the optical signal transmission board 100, it is necessary to perform, in the laminating step of the boards, many heat and solvent treatment processes such as a thermal curing process and thermal annealing process for the resin configuring the boards, an UV light irradiation process for printed wiring, an alkaline treatment for resist development, and a cleaning process. According to the manufacturing method of the optical signal transmission system 10 in accordance with this embodiment, it is satisfactory if the opening for inserting the optical connection board 130 or the like thereinto may be provided by performing a drilling process after the above-described processes, and thus the first optical waveguide 110 can be prevented from being broken or damaged.

Moreover, the opening of the optical signal transmission board 100 is filled with the transparent resin, and the optical connection board 130 or the like is inserted therethrough. Accordingly, even if irregularities occur on the sidewall of the opening to some extent, the optical coupling efficiency can be prevented from being lowered. Therefore, the drilling process for the optical signal transmission board 100 can be performed not by a highly precise process such as a laser beam machining but by machining controlled so as not to cause a burr.

Moreover, the optical connection board 130 and the optical connection board 230 are small in size as compared with the optical signal transmission board 100, and accordingly, processes such as the molding and the diamond cutting can be easily performed therefor. Moreover, also in the deposition process for the reflection surface 155 and the reflection surface 255, the reflection films can be deposited by use of a compact evaporation apparatus, and thus the manufacturing cost can be reduced.

Although the present invention has been described above by use of the embodiments, the technical scope of the present invention is not limited to the scope described in the embodiments. It is apparent to those skilled in the art that it is possible to add various alterations or modifications to the above-described embodiments. It is apparent from description in the claims that modes added with such alterations or modifications as described above can be incorporated in the technical scope of the present invention.

According to the above-described embodiments, optical connection boards, optical signal transmission systems, and methods for manufacturing the optical signal transmission systems, which are described in the following respective items, are realized.

(Item 1) An optical connection board inserted into an opening of an optical signal transmission board substantially perpendicularly thereto, the opening being provided in an upper surface of the optical signal transmission board having a first optical waveguide, the optical connection board comprising: a board; a second optical waveguide extended on an upper surface of the board; and a reflection surface provided in an end portion of the second optical waveguide, reflecting light traveling through the second optical waveguide, and making the light incident onto the first optical waveguide extended in a direction substantially perpendicular to the board.

(Item 2) The optical connection board according to Item 1, further comprising: a cladding layer being in contact with the board and serving as a cladding of the second optical waveguide, wherein the second optical waveguide has a core extended parallel to the board within the cladding layer.

(Item 3) The optical connection board according to Item 2, wherein the reflection surface reflects the light traveling through the second optical waveguide in a direction away from the board, and makes the light incident onto the first optical waveguide.

(Item 4) The optical connection board according to Item 2, wherein the reflection surface reflects the light traveling through the second optical waveguide in a direction toward the board, transmits the light through the board, and makes the light incident onto the first optical waveguide.

(Item 5) The optical connection board according to Item 1, wherein the second optical waveguide has a core extended on an upper surface of the board, the board is formed of a material serving as a cladding of the second optical waveguide, and the optical connection board further comprises a cladding layer being in contact with the upper surface of the board and an upper surface and side surface of the core and serving as a cladding of the second optical waveguide.

(Item 6) The optical connection board according to Item 1, wherein the first optical waveguide and the second optical wave guide have cores and claddings covering outer circumferences of the cores, and the optical connection board further comprises a connection portion formed of a core material and for propagating, to the reflection surface by the core material, light emitted from the core in the end portion of the second optical waveguide, and propagating, by the core material, the light reflected by the reflection surface, to make the light incident onto the core in an end portion of the first optical waveguide.

(Item 7) The optical connection board according to Item 6, wherein the reflection surface has a spheroidal surface shape in which approximate center points of the cores in the end portion of the first optical waveguide and the end portion of the second optical waveguide are set as focal points.

(Item 8) The optical connection board according to Item 1, wherein the reflection surface has a concave shape.

(Item 9) The optical connection board according to Item 1, further comprising: a positioning portion for determining depth of the optical connection board inserted into the optical signal transmission board so that the light reflected by the reflection surface is made incident onto the first optical waveguide.

(Item 10) The optical connection board according to Item 9, wherein the positioning portion does not allow the optical connection board to be further inserted into the optical signal transmission board in a state where the optical connection board is inserted into the opening of the optical signal transmission board to a predetermined depth, thus determining a position of the reflection surface with respect to the first optical waveguide.

(Item 11) The optical connection board according to Item 9, wherein a positioning plane parallel to the optical signal transmission board is provided in an inside of the opening of the optical signal transmission board, and the positioning portion is in contact with an upper surface of the positioning plane in a state where the optical connection board is inserted into the opening of the optical signal transmission board to a predetermined depth.

(Item 12) The optical connection board according to Item 9, wherein the positioning portion is a side surface of the board inserted into the opening, and does not allow the optical connection board to be further inserted into the optical signal transmission board in a state where the side surface is in contact with a bottom surface of the opening, thus determining a position of the reflection surface with respect to the first optical waveguide.

(Item 13) The optical connection board according to Item 1, comprising: a plurality of the second optical waveguides; and cladding layers being in contact with the board and serving as claddings of the plurality of second optical waveguides.

(Item 14) The optical connection board according to Item 1, further comprising: a light emitting unit mounted on the optical connection board; and a light guide unit for making an optical signal outputted by the light emitting unit onto a first end portion of the second optical waveguide, wherein the reflection surface is provided in a second end portion of the second optical waveguide, reflects the optical signal traveling through the second optical waveguide, and makes the optical signal incident onto the first optical waveguide.

(Item 15) The optical connection board according to Item 14, further comprising: an electronic device mounted on the optical connection board; and wiring for inputting, to the light emitting unit, an electric signal outputted from the electronic device, wherein the light emitting unit converts the electric signal inputted from the electronic device into the optical signal.

(Item 16) An optical connection board inserted into an opening of an optical signal transmission board substantially perpendicularly thereto, the opening being provided in an upper surface of the optical signal transmission board having a first optical waveguide, the optical connection board comprising: a board; a second optical waveguide extended on an upper surface of the board; and a reflection surface provided in an end portion of the second optical waveguide, reflecting light incident from the first optical waveguide extended in a direction substantially perpendicular to the board, and making the light incident onto the second optical waveguide.

(Item 17) An optical signal transmission system comprising an optical signal transmission board having a first optical waveguide, and comprising an optical connection board having a second optical waveguide and inserted into an opening of the optical signal transmission board substantially perpendicularly thereto, the opening being provided in an upper surface of the optical signal transmission board, wherein the optical signal transmission board comprises: a first board; the first optical waveguide extended on an upper surface of the first board; and a second board made parallel to the first board so that a lower surface thereof is in contact with an upper surface of the first optical waveguide, the opening extended from the upper surface thereof toward the first board is provided in the optical signal transmission board, and the optical connection board comprises: a third board; the second optical waveguide extended on an upper surface of the third board; and a reflection surface provided in an end portion of the second optical waveguide, reflecting light traveling through the second optical waveguide, and making the light incident onto the first optical waveguide extended in a direction substantially perpendicular to the third board.

(Item 18) The optical signal transmission system according to Item 17, further comprising: transparent resin injected into the opening of the optical signal transmission board and filling a gap between the optical signal transmission board and the optical connection board.

(Item 19) An optical signal transmission system comprising an optical signal transmission board having a first optical waveguide, and comprising an optical connection board having a second optical waveguide and inserted into an opening of the optical signal transmission board substantially perpendicularly thereto, the opening being provided in an upper surface of the optical signal transmission board, wherein the optical signal transmission board comprises: a first board; the first optical waveguide extended on an upper surface of the first board; and a second board made parallel to the first board so that a lower surface thereof is in contact with an upper surface of the first optical waveguide, the opening extended from the upper surface thereof toward the first board is provided in the optical signal transmission board, and the optical connection board comprises: a third board; the second optical waveguide extended on an upper surface of the third board; and a reflection surface provided in an end portion of the second optical waveguide, reflecting light incident from the first optical waveguide extended in a direction substantially perpendicular to the third board, and making the light incident onto the second optical waveguide.

(Item 20) A method for manufacturing an optical signal transmission system comprising an optical signal transmission board having a first optical waveguide, and comprising an optical connection board having a second optical waveguide and inserted into an opening of the optical signal transmission board substantially perpendicularly thereto, the opening being provided in an upper surface of the optical signal transmission board, the method comprising: an optical signal transmission board fabrication step of forming the optical signal transmission board comprising a first board, the first optical waveguide extended on an upper surface of the first board, and a second board made parallel to the first board so that a lower surface thereof is in contact with an upper surface of the first optical waveguide; a second optical waveguide fabrication step of forming the second optical waveguide extended on an upper surface of a third board; a reflection surface fabrication step of forming a reflection surface reflecting light traveling through the second optical waveguide in an end portion of the second optical waveguide; an opening fabrication step of forming the opening extended from the upper surface of the optical signal transmission board toward the first board; and an optical connection board insertion step of inserting the optical connection board into the opening of the optical signal transmission board, and disposing the reflection surface at a position where the light traveling through the second optical waveguide and reflected by the reflection surface is made incident onto the first optical waveguide extended in a direction substantially perpendicular to the third board.

(Item 21) The method according to Item 20, wherein the second optical waveguide fabrication step further comprises a cladding layer fabrication step of forming a core of the second optical waveguide extended on the upper surface of the third board and forming a cladding layer being in contact with the upper surface of the third board and the core and serving as a cladding of the second optical waveguide.

(Item 22) The method according to Item 20, further comprising: a first cladding layer fabrication step of forming, on the upper surface of the third board, a first cladding layer having a groove portion in which an inner wall is formed into a shape of a core of the second optical waveguide and serving as a cladding of the second optical waveguide, wherein the second optical waveguide fabrication step further comprises a second cladding layer fabrication step of filling a core material in the groove portion of the first cladding layer, forming the core of the second optical waveguide, and then forming a second cladding layer serving as a cladding of the second optical waveguide on an upper surface of the first cladding layer in which the groove portion is filled with the core material.

(Item 23) The method according to Item 20, further comprising: a transparent resin injection step of injecting, into the opening of the optical signal transmission board, transparent resin filling a gap between the optical signal transmission board and the optical connection board.

(Item 24) A method for manufacturing an optical signal transmission system comprising an optical signal transmission board having a first optical waveguide, and comprising an optical connection board having a second optical waveguide and inserted into an opening of the optical signal transmission board substantially perpendicularly thereto, the opening being provided in an upper surface of the optical signal transmission board, the method comprising: an optical signal transmission board fabrication step of forming the optical signal transmission board comprising a first board, the first optical waveguide extended on an upper surface of the first board, and a second board made parallel to the first board so that a lower surface thereof is in contact with an upper surface of the first optical waveguide; a second optical waveguide fabrication step of forming the second optical waveguide extended on an upper surface of a third board; a reflection surface fabrication step of forming a reflection surface reflecting light incident from the first optical waveguide in an end portion of the second optical waveguide; an opening fabrication step of forming the opening extended from the upper surface of the optical signal transmission board toward the first board; and an optical connection board insertion step of inserting the optical connection board into the opening of the optical signal transmission board, and disposing the reflection surface at a position where light emitted from the first optical waveguide extended in a direction substantially perpendicular to the third board and reflected by the reflection surface is made incident onto the second optical waveguide.

According to the present invention, the optical waveguide disposed in the inner layer portion of the board and the light receiving/emitting element can be connected to each other with high coupling efficiency.

Although the preferred embodiments of the present invention have been described in detail, it should be understood that various changes, substitutions and alternations can be made therein without departing from spirit and scope of the inventions as defined by the appended claims.

What is claimed is:
1. An apparatus comprising:
an optical connection board inserted into an opening of an optical signal transmission board substantially perpendicularly thereto, the opening being provided in an upper surface of the optical signal transmission board having a first optical waveguide, the optical connection board comprising:
a board;
a second optical waveguide extended on an upper surface of the board; and
a reflection surface provided in an end portion of the second optical waveguide, reflecting light traveling through the second optical waveguide, and making the light incident onto the first optical waveguide extended in a direction substantially perpendicular to the board.

2. The apparatus according to claim 1, wherein the optical connection board further comprises:
a cladding layer being in contact with the board and serving as a cladding of the second optical waveguide, wherein the second optical waveguide has a core extended parallel to the board within the cladding layer.

3. The apparatus according to claim 2, wherein the reflection surface reflects the light traveling through the second optical waveguide in a direction away from the board, and makes the light incident onto the first optical waveguide.

4. The apparatus according to claim 2, wherein the reflection surface reflects the light traveling through the second optical waveguide in a direction toward the board, transmits the light through the board, and makes the light incident onto the first optical waveguide.

5. The apparatus according to claim 1,
wherein the second optical waveguide has a core extended on an upper surface of the board,
the board is formed of a material serving as a cladding of the second optical waveguide, and
the optical connection board further comprises a cladding layer being in contact with the upper surface of the board and an upper surface and side surface of the core and serving as a cladding of the second optical waveguide.

6. The apparatus according to claim 1,
wherein the first optical waveguide and the second optical wave guide have cores and claddings covering outer circumferences of the cores, and
the optical connection board further comprises a connection portion formed of a core material and for propagating, to the reflection surface by the core material, light emitted from the core in the end portion of the second optical waveguide, and propagating, by the core material, the light reflected by the reflection surface, to make the light incident onto the core in an end portion of the first optical waveguide.

7. The apparatus according to claim 6, wherein the reflection surface has a spheroidal surface shape in which approximate center points of the cores in the end portion of the first optical waveguide and the end portion of the second optical waveguide are set as focal points.

8. The apparatus according to claim 1, wherein the reflection surface has a concave shape.

9. The apparatus according to claim 1, further comprising:
a positioning portion for determining depth of the optical connection board inserted into the optical signal transmission board so that the light reflected by the reflection surface is made incident onto the first optical waveguide.

10. The apparatus according to claim 9, wherein the positioning portion does not allow the optical connection board to be further inserted into the optical signal transmission board in a state where the optical connection board is inserted into the opening of the optical signal transmission board to a predetermined depth, thus determining a position of the reflection surface with respect to the first optical waveguide.

11. The apparatus according to claim 9, wherein a positioning plane parallel to the optical signal transmission board is provided in an inside of the opening of the optical signal transmission board, and
the positioning portion is in contact with an upper surface of the positioning plane in a state where the optical connection board is inserted into the opening of the optical signal transmission board to a predetermined depth.

12. The apparatus according to claim 9, wherein the positioning portion is a side surface of the board inserted into the opening, and does not allow the optical connection board to be further inserted into the optical signal transmission board in a state where the side surface is in contact with a bottom surface of the opening, thus determining a position of the reflection surface with respect to the first optical waveguide.

13. The apparatus according to claim 1, comprising:
a plurality of the second optical waveguides; and
cladding layers being in contact with the board and serving as claddings of the plurality of second optical waveguides.

14. The apparatus according to claim 1, further comprising:
a light emitting unit mounted on the optical connection board; and
a light guide unit for making an optical signal outputted by the light emitting unit onto a first end portion of the second optical waveguide,
wherein the reflection surface is provided in a second end portion of the second optical waveguide, reflects the optical signal traveling through the second optical waveguide, and makes the optical signal incident onto the first optical waveguide.

15. The apparatus according to claim 14, further comprising:
an electronic device mounted on the optical connection board; and
wiring for inputting, to the light emitting unit, an electric signal outputted from the electronic device,
wherein the light emitting unit converts the electric signal inputted from the electronic device into the optical signal.

16. An apparatus comprising:
an optical connection board inserted into an opening of an optical signal transmission board substantially perpendicularly thereto, the opening being provided in an upper surface of the optical signal transmission board having a first optical waveguide, the optical connection board comprising:
a board;
a second optical waveguide extended on an upper surface of the board; and
a reflection surface provided in an end portion of the second optical waveguide, reflecting light incident from the first optical waveguide extended in a direction substantially perpendicular to the board, and making the light incident onto the second optical waveguide.

17. An optical signal transmission system comprising an optical signal transmission board having a first optical waveguide, and comprising an optical connection board having a second optical waveguide and inserted into an opening of the optical signal transmission board substantially perpendicularly thereto, the opening being provided in an upper surface of the optical signal transmission board,
wherein the optical signal transmission board comprises:
a first board;
the first optical waveguide extended on an upper surface of the first board; and
a second board made parallel to the first board so that a lower surface thereof is in contact with an upper surface of the first optical waveguide, in the optical signal transmission board, the opening extended from the upper surface thereof toward the first board is provided, and the optical connection board comprises:
a third board;
the second optical waveguide extended on an upper surface of the third board; and
a reflection surface provided in an end portion of the second optical waveguide, reflecting light traveling through the second optical waveguide, and making the light incident onto the first optical waveguide extended in a direction substantially perpendicular to the third board.

18. The optical signal transmission system according to claim 17, further comprising: transparent resin injected into the opening of the optical signal transmission board and filling a gap between the optical signal transmission board and the optical connection board.

19. An optical signal transmission system comprising an optical signal transmission board having a first optical waveguide, and comprising an optical connection board having a second optical waveguide and inserted into an opening of the optical signal transmission board substantially perpendicularly thereto, the opening being provided in an upper surface of the optical signal transmission board, wherein the optical signal transmission board comprises:
 a first board;
 the first optical waveguide extended on an upper surface of the first board; and
 a second board made parallel to the first board so that a lower surface thereof is in contact with an upper surface of the first optical waveguide,
 in the optical signal transmission board, the opening extended from the upper surface thereof toward the first board is provided, and the optical connection board comprises:
  a third board;
  the second optical waveguide extended on an upper surface of the third board; and
  a reflection surface provided in an end portion of the second optical waveguide, reflecting light incident from the first optical waveguide extended in a direction substantially perpendicular to the third board, and making the light incident onto the second optical waveguide.

20. A method comprising manufacturing an optical signal transmission system, said system comprising an optical signal transmission board having a first optical waveguide, and comprising an optical connection board having a second optical waveguide and inserted into an opening of the optical signal transmission board substantially perpendicularly thereto, the opening being provided in an upper surface of the optical signal transmission board, the step of manufacturing comprising:
 an optical signal transmission board fabrication step of forming the optical signal transmission board comprising a first board, the first optical waveguide extended on an upper surface of the first board, and a second board made parallel to the first board so that a lower surface thereof is in contact with an upper surface of the first optical waveguide;
 a second optical waveguide fabrication step of forming the second optical waveguide extended on an upper surface of a third board;
 a reflection surface fabrication step of forming a reflection surface reflecting light traveling through the second optical waveguide in an end portion of the second optical waveguide;
 an opening fabrication step of forming the opening extended from the upper surface of the optical signal transmission board toward the first board; and
 an optical connection board insertion step of inserting the optical connection board into the opening of the optical signal transmission board, and disposing the reflection surface at a position where the light traveling through the second optical waveguide and reflected by the reflection surface is made incident onto the first optical waveguide extended in a direction substantially perpendicular to the third board.

21. The method according to claim 20, wherein the second optical waveguide fabrication step further comprises a cladding layer fabrication step of forming a core of the second optical waveguide extended on the upper surface of the third board and forming a cladding layer being in contact with the upper surface of the third board and the core and serving as a cladding of the second optical waveguide.

22. The method according to claim 20, further comprising:
 a first cladding layer fabrication step of forming, on the upper surface of the third board, a first cladding layer having a groove portion in which an inner wall is formed into a shape of a core of the second optical waveguide and serving as a cladding of the second optical waveguide,
 wherein the second optical waveguide fabrication step further comprises a second cladding layer fabrication step of filling a core material in the groove portion of the first cladding layer, forming the core of the second optical waveguide, and then forming a second cladding layer serving as a cladding of the second optical waveguide on an upper surface of the first cladding layer in which the groove portion is filled with the core material.

23. The method according to claim 20, further comprising: a transparent resin injection step of injecting, into the opening of the optical signal transmission board, transparent resin filling a gap between the optical signal transmission board and the optical connection board.

24. A method comprising manufacturing an optical signal transmission system comprising an optical signal transmission board having a first optical waveguide, and comprising an optical connection board having a second optical waveguide and inserted into an opening of the optical signal transmission board substantially perpendicularly thereto, the opening being provided in an upper surface of the optical signal transmission board, the step of manufacturing comprising:
 an optical signal transmission board fabrication step of forming the optical signal transmission board comprising a first board, the first optical waveguide extended on an upper surface of the first board, and a second board made parallel to the first board so that a lower surface thereof is in contact with an upper surface of the first optical waveguide;
 a second optical waveguide fabrication step of forming the second optical waveguide extended on an upper surface of a third board;
 a reflection surface fabrication step of forming a reflection surface reflecting light incident from the first optical waveguide in an end portion of the second optical waveguide;
 an opening fabrication step of forming the opening extended from the upper surface of the optical signal transmission board toward the first board; and
 an optical connection board insertion step of inserting the optical connection board into the opening of the optical signal transmission board, and disposing the reflection surface at a position where light emitted from the first optical waveguide extended in a direction substantially perpendicular to the third board and reflected by the reflection surface is made incident onto the second optical waveguide.

* * * * *